(12) United States Patent
Fan et al.

(10) Patent No.: US 12,457,026 B2
(45) Date of Patent: Oct. 28, 2025

(54) BEAM WIDTH CONTROL

(71) Applicant: APPLE INC., Cupertino, CA (US)

(72) Inventors: Boqiang Fan, San Diego, CA (US); Laxminarayana Pillutla, San Diego, CA (US); Mithat C. Dogan, San Jose, CA (US); Sharad Sambhwani, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/227,868

(22) Filed: Jul. 28, 2023

(65) Prior Publication Data

US 2024/0039607 A1 Feb. 1, 2024

Related U.S. Application Data

(60) Provisional application No. 63/393,782, filed on Jul. 29, 2022.

(51) Int. Cl.
*H04B 7/06* (2006.01)
*H04W 16/28* (2009.01)

(52) U.S. Cl.
CPC ........ *H04B 7/06952* (2023.05); *H04W 16/28* (2013.01)

(58) Field of Classification Search
CPC ..... H04W 76/27; H04W 16/28; H04W 80/02; H04W 24/10; H04W 72/23; H04W 28/06; H04W 74/0833; H04W 76/19; H04W 72/046; H04B 7/0617; H04B 7/0695; H04B 7/088; H04B 7/0456; H04B 7/0626; H04B 7/0639; H04B 7/0408; H04B 7/0632; H04L 5/0048; H04L 5/0053; H04L 69/04; H04L 69/22; H04L 5/001; H04L 5/0023; H04L 5/0051; H04L 5/0098; H04L 5/0094
USPC ......................................................... 375/267
See application file for complete search history.

(56) References Cited

U.S. PATENT DOCUMENTS

| | | | |
|---|---|---|---|
| 9,456,454 | B2 | 9/2016 | Gao et al. |
| 10,716,015 | B1 * | 7/2020 | Marupaduga ............ H01Q 3/30 |
| 10,855,414 | B2 | 12/2020 | Zhou et al. |
| 10,863,511 | B2 | 12/2020 | Cheng |
| 11,368,967 | B2 | 6/2022 | Golitschek Edler Von Elbwart et al. |
| 12,063,668 | B2 | 8/2024 | Kumar |
| 2001/0024173 | A1 | 9/2001 | Katz |
| 2012/0243499 | A1 | 9/2012 | Moon et al. |
| 2012/0287878 | A1 | 11/2012 | Moon et al. |
| 2013/0229307 | A1 | 9/2013 | Chang et al. |
| 2016/0065286 | A1 | 3/2016 | Kim et al. |
| 2017/0212244 | A1 | 7/2017 | Park |
| 2017/0317729 | A1 * | 11/2017 | Kobayashi .......... H04W 64/006 |
| 2019/0326981 | A1 | 10/2019 | Wang et al. |
| 2020/0068415 | A1 * | 2/2020 | Lee ...................... H04B 7/0617 |

(Continued)

OTHER PUBLICATIONS

Invitation to Pay Additional Fees and, Where Applicable, Protest Fee issued in PCT Application No. PCT/US2023/028893, dated Nov. 21, 2023 in 4 pages.

(Continued)

*Primary Examiner* — Eva Y Puente
(74) *Attorney, Agent, or Firm* — Kilpatrick Townsend & Stockton LLP

(57) ABSTRACT

Techniques for beam width control, and devices and components including apparatus, systems, and methods for beam width control are described herein.

19 Claims, 25 Drawing Sheets

(56) References Cited

U.S. PATENT DOCUMENTS

| | | | | |
|---|---|---|---|---|
| 2020/0099426 | A1* | 3/2020 | Simonsson | H04B 7/0697 |
| 2020/0235800 | A1 | 7/2020 | Tang et al. | |
| 2020/0322017 | A1* | 10/2020 | Lee | H04B 7/0695 |
| 2021/0028841 | A1 | 1/2021 | Logothetis et al. | |
| 2021/0119687 | A1 | 4/2021 | Wong et al. | |
| 2021/0127379 | A1 | 4/2021 | Harrebek et al. | |
| 2021/0377918 | A1 | 12/2021 | Saber et al. | |
| 2022/0070843 | A1 | 3/2022 | Levitsky et al. | |
| 2022/0094417 | A1 | 3/2022 | Ashari et al. | |
| 2022/0123804 | A1 | 4/2022 | Quan et al. | |
| 2022/0385350 | A1* | 12/2022 | Sahoo | H04B 7/0695 |
| 2023/0063285 | A1* | 3/2023 | Horn | H04B 17/27 |
| 2023/0217265 | A1* | 7/2023 | Huang | H04B 7/0617 |
| | | | | 370/329 |
| 2024/0243791 | A1 | 7/2024 | Huang et al. | |

OTHER PUBLICATIONS

Technical Report, "3rd Generation Partnership Project; Technical Specification Group Radio Access Network; Study on New Radio Access Technology Physical Layer Aspects (Release 14)", 3GPP TR 38.802 V14.2.0,, Keywords New Radio, dated Sep. 2017 in 145 pages.

Article entitled, "5G NR in Bullets", 9.2 Downlink Beam Refinement, Available Online at: www.5g-bullets.com, pp. 384-386.

Technical Specification, "5G, NR, Physical Layer Procedures for Control", (3GPP TS 38.213 version 17.2.0 Release 17), ETSI TS 138 213 V17.2.0, Jul. 2022, Reference RTS/TSGR-0138213vh20 in 258 pages.

Technical Specification, "5G, NR, Physical Layer Procedures for Data", (3GPP TS 38.214 version 17.2.0 Release 17), ETSI TS 138 214 V17.2.0, Jul. 2022, Reference RTS/TSGR-0138214vh20 in 235 pages.

Technical Specification, "5G, NR, Requirements for Support of Radio Resource Management", (3GPP TS 38.133 version 17.5.0 Release 17), ETSI TS 138 133 V17.5.0, May 2022, Reference RTS/TSGR-0438133vh50 in 3114 pages.

Technical Specification, "5G, NR, User Equipment (UE) Radio Access Capabilities", (3GPP TS 38.306 version 17.0.0 Release 17), ETSI TS 138 306 V17.0.0, May 2022, Reference RTS/TSGR-0238306vh00 in 175 pages.

Technical Report, "5G, Study on New Radio (NR) Access Technology", (3GPP TR 38.912 version 17.0.0 Release 17), ETSI TR 138 912 V17.0.0, May 2022, Reference RTS/TSGR-0038912vh00 in 78 pages.

Document entitled, "Architecture Overview", NCHU CSE LTE-1 in 113 pages.

Samsung, Technical White Paper, "Massive MIMO for New Radio", dated Dec. 2020 in 22 pages.

Meeting document entitled, "Revised WID on Multi-carrier Enhancements", NTT, Docomo, Inc., Agenda Item: 9.3.1.2, 3GPP TSG RAN Meeting #95e, RP-220834, Electronic Meeting, Mar. 17-23, 2022 in 5 pages.

Meeting document, "Summary of NR Dynamic Spectrum Sharing (DSS)", Agenda Item: 8.13, Moderator (Ericsson), 3GPP TSG-RAN WG1 #102-e, R1-20xxxxx, eMeeting Aug. 17-28, 2020 in 19 pages.

Meeting document entitled, "Summary on UE features for URLLC/IIoT", Agenda Item: 7.2.11.5, 3GPP TSG RAN WG1 #100bis-e, R1-2002459, e-Meeting, Apr. 20-30, 2020 in 65 pages.

Brochure entitled, "Understanding LTE-Advanced Carrier Aggregation", Anritsu Discover What's Possible, Issue 2, dated Sep. 2013 in 72 pages.

Brochure entitled, "WaveJudge LTE-A Carrier Aggregation Testing", LTE-CA 06192013, 2013 in 4 pages.

Ahmed, Samir, "Beamforming Management and Beam Training in 5G System", Tampere University, Master of Science Thesis, Faculty of Information Technology and Communication Science, dated Nov. 2019 in 63 pages.

Basar et al., "SimRIS Channel Simulator for Reconfigurable Intelligent Surface-Empowered Communication Systems", Available Online at: https://arxiv.org/abs/2006.00468, May 31, 2020 in 6 pages.

Giordani et al., "A Tutorial on Beam Management for 3GPP NR at mmWave Frequencies", Available Online at: https://arxiv.org/pdf/1804.01908.pdf, dated Nov. 4, 2019, pp. 1-22.

Hamdy, Dr. Mohamed Nadder PH.D., "Beamformers Explained", commscope.com, 2020 in 28 pages.

Hedlund et al., "An Introduction to Carrier Aggregation Testing", TEMS White Paper, Formerly Ascom Network Testing, 2017 in 30 pages.

Li et al., "Search Space Design for Cross-Carrier Scheduling in Carrier Aggregation of LTE-Advanced System", Conference Paper, IEEE International Conference on Communications (ICC), Jun. 5-9, 2011 in 6 pages.

Rahman et al., "Enabling the Potential of 5G: Solutions to the Technical Challenges of the Diverse 5G Bands", Industry Perspectives, IEEE Wireless Communications, vol. 27, No. 2, Apr. 2020, pp. 6-11.

Salihu et al., "New Remapping Strategy for PDCCH Scheduling for LTE-Advanced Systems", Journal of Communications, vol. 9, No. 7, Jul. 2014, Engineering and Technology Publishing, pp. 563-571.

Tripathi et al., "Millimeter-wave and Terahertz Spectrum for 6G Wireless", Available Online at: https://arxiv.org/pdf/2102.10267.pdf, Feb. 20, 2021, pp. 1-17.

Zhou et al., "Beam Acquisition and Training in Millimeter Wave Networks with Narrowband Pilots", Available Online at: https://arxiv.org/pdf/1902.02267.pdf, Oct. 10, 2019, pp. 1-13.

International Search Report and the Written Opinion issued in PCT Application No. PCT/US2023/028892, dated Nov. 6, 2023 in 12 pages.

International Search Report and Written Opinion issued in PCT Application No. PCT/US2023/028893, dated Jan. 18, 2024 in 19 pages.

Non-Final Office Action issued in U.S. Appl. No. 18/227,872, dated Oct. 28, 2024 in 10 pages.

International Preliminary Report on Patentability issued in PCT Application No. PCT/US2023/028892, dated Feb. 13, 2025 in 10 pages.

International Preliminary Report on Patentability issued in PCT Application No. PCT/US2023/028893, dated Feb. 13, 2025 in 14 pages.

Final Office Action issued in U.S. Appl. No. 18/227,872, dated Apr. 14, 2025 in 11 pages.

\* cited by examiner

| $b_0b_1b_2$ | Beam width change |
|---|---|
| 000 | 0 |
| 001 | -10 |
| 010 | -5 |
| 011 | -1.5 |
| 100 | 40 |
| 101 | 10 |
| 110 | 5 |
| 111 | 1.5 |

Fig. 9B

| $b_0b_1b_2b_3$ | Beam width change |
|---|---|
| 0000 | 0 |
| 0001 | -40 |
| 0010 | -20 |
| 0011 | -10 |
| 0100 | -7.5 |
| 0101 | -5 |
| 0110 | -2.5 |
| 0111 | -1.5 |
| 1000 | 60 |
| 1001 | 40 |
| 1010 | 20 |
| 1011 | 10 |
| 1100 | 7.5 |
| 1101 | 5 |
| 1110 | 2.5 |
| 1111 | 1.5 |

Fig. 9A

| $c_0c_1c_2$ | Beam width |
|---|---|
| 000 | Failure |
| 001 | 120 |
| 010 | 80 |
| 011 | 40 |
| 100 | 20 |
| 101 | 10 |
| 110 | 4 |
| 111 | 1.5 |

Fig. 10B

| $c_0c_1c_2c_3$ | Beam width |
|---|---|
| 0000 | Failure |
| 0001 | 120 |
| 0010 | 100 |
| 0011 | 80 |
| 0100 | 60 |
| 0101 | 50 |
| 0110 | 40 |
| 0111 | 30 |
| 1000 | 25 |
| 1001 | 20 |
| 1010 | 15 |
| 1011 | 10 |
| 1100 | 7.5 |
| 1101 | 5 |
| 1110 | 2.5 |
| 1111 | 1.5 |

Fig. 10A

BEAM WIDTH CONTROL

CROSS-REFERENCES TO OTHER APPLICATIONS

This application claims priority to U.S. Provisional Application No. 63/393,782, for "BEAM WIDTH CONTROL," filed on Jul. 29, 2022, which is herein incorporated by reference in its entirety for all purposes.

TECHNICAL FIELD

This application generally relates to cellular communication networks and, in particular, to technologies for beam width control.

BACKGROUND

Third Generation Partnership Project (3GPP) Technical Specifications (TSs) define standards for wireless networks. These TSs describe certain beam management and beam failure recovery procedures for operation within such networks.

BRIEF DESCRIPTION OF THE DRAWINGS

FIGS. 9A and 9B show two examples of a format for a BEAM_WIDTH_REQ signal in accordance with some embodiments.

FIGS. 10A and 10B show two examples of a format for a BEAM_WIDTH_CONFIG signal in accordance with some embodiments.

DETAILED DESCRIPTION

Figure 1:
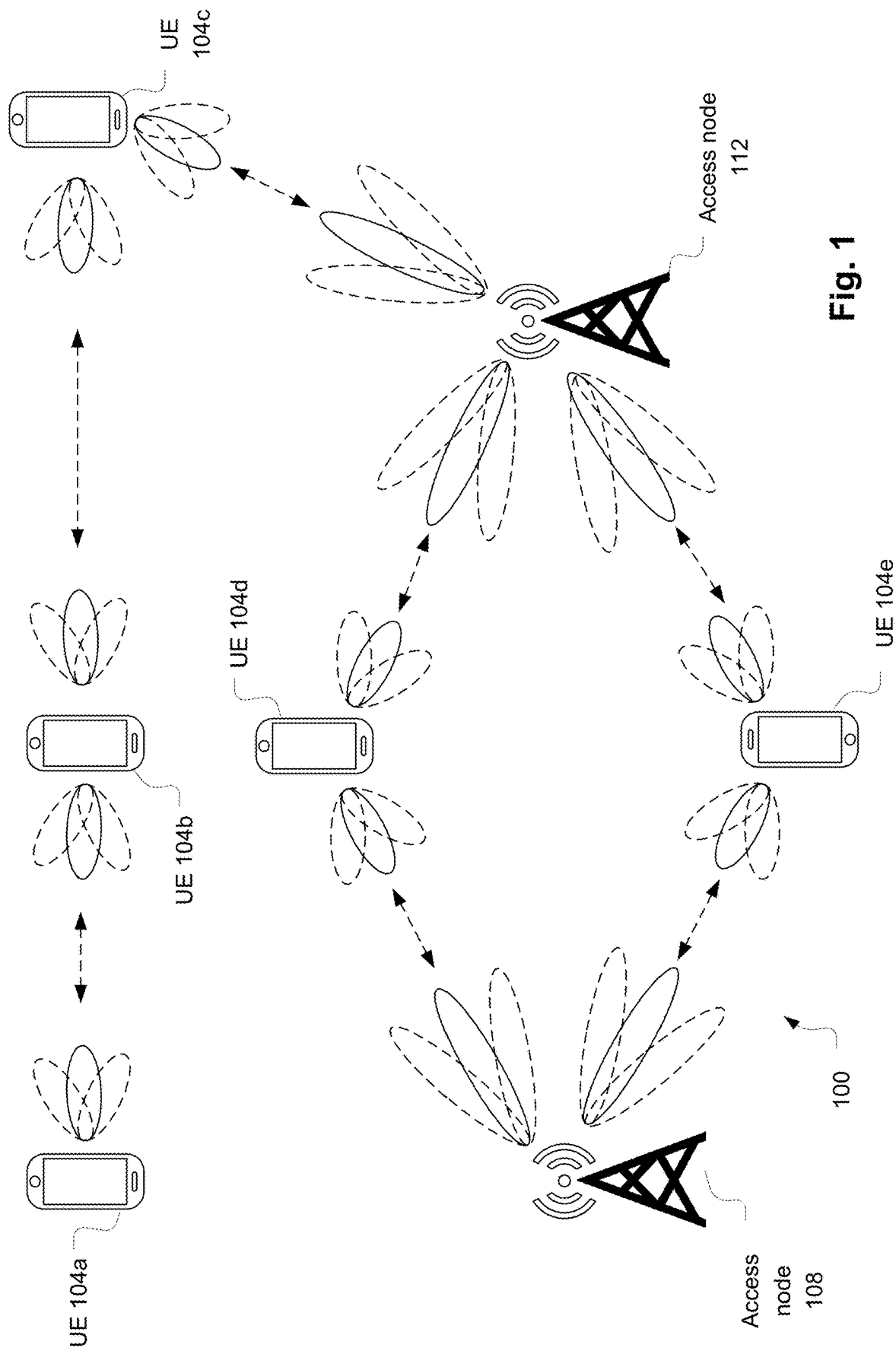
FIG. 1 shows a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B). For the purposes of the present document, the phrase "A is based on B" means "A is based on at least B."

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point. The term "obtaining" is used to indicate any of its ordinary meanings, such as calculating, deriving, receiving (e.g., from another element or device), and/or retrieving (e.g., from memory/storage as described below). The term "determining" is used to indicate any of its ordinary meanings, such as calculating, deriving, and/or selecting.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Techniques for beam width control are described herein, including techniques for bidirectional control signaling and techniques for joint beam width and power control. FIG. 1 illustrates a network environment 100 in accordance with some embodiments. The nodes in such a network environment 100 may include one or more UEs 104a-104e and one or more access points such as, for example, access nodes 108 and 112. The UEs 104a-104e may communicate with access nodes 108 and 112 over air interfaces compatible with 3GPP TSs, such as those that define Long Term Evolution (LTE) or Fifth Generation (5G) new radio (NR) system standards (e.g., over an NR-Uu interface), as shown, for example, with reference to UEs 104c, 104d, and 104e. Each access node 108 and 112 may provide one or more 5G New Radio (NR) cells to provide NR user plane and control plane protocol terminations toward the UEs 104a-104e. Each access node 108 and 112 may be, or may be controlled by, a base station (BS), such as a next generation node B (gNB). Each of the UEs 104a-104e may, additionally or alternatively, communicate with one or more of the other UEs 104a-104e (e.g., over a side link) as shown, for example, with reference to UEs 104a, 104b, and 104c.

The access nodes 108 and 112 may transmit information (for example, data and control signaling) in the downlink direction by mapping logical channels on the transport channels, and transport channels onto physical channels. The logical channels may transfer data between a radio link control (RLC) layer and a media access control (MAC) layer; the transport channels may transfer data between the MAC and physical (PHY) layers; and the physical channels may transfer information across the air interface.

The UEs 104a-104e may communicate with access nodes 108/112 and/or each other over bands in Frequency Range 1

(FR1) or in Frequency Range 2 (FR2). For FR1 (e.g., below 7.225 GHz), a transmit antenna of a UE 104a-104e is typically implemented as an omnidirectional antenna. For FR2 (e.g., 24.250 GHz and above, also called mmWave), a transmit antenna of a UE 104a-104e may be implemented as a panel having multiple antenna elements. For example, the multiple antenna elements of a panel may be driven as a phased array (e.g., to direct a beam in a desired direction).

The carrier frequencies of communications systems have increased continuously to provide more bandwidth for enabling high-speed data transmission. Current 5G NR systems may use carrier frequencies in the range of from about 25 GHz to 100 GHz in the mmWave band (30-300 GHz), and the use of carriers in the THz band (0.1-10 THz) is under consideration. Transmissions in such high-frequency bands can be expected to experience increased propagation loss. Such loss may be compensated by using beamforming techniques, in which narrow beams are used to focus transmission power in the direction of interest. FIG. 1 shows examples of such beamforming in which the nodes at each end of a communications link transmit over a narrow beam (depicted as solid curves). A beam management protocol may include monitoring beam quality and switching to another beam of a beam configuration (depicted as dashed curves) as conditions change. For example, the receiving node may indicate to the transmitting node that the quality of another beam is approaching or has become greater than the quality of the current beam (which may occur due to, e.g., movement of a node or changes in the propagation path between the nodes), and the transmitting node may switch to the other beam in response.

However, the use of narrow beams gives rise to new challenges, which may include reduced robustness to uncertainties such as blockage, mobility, interference, and channel fluctuation. Such challenges may become especially problematic when, for example, a node is not aware that such an uncertainty currently exists on the other side of a link. Current standards do not provide an effective solution to these challenges.

Techniques as described herein may be used to implement dynamic control of beam width and power according to transmission/reception demands. Such demands may be based on, for example, device status (which may include one or more of speed, orientation, direction of movement, etc., of a node), environment status (which may include a presence, movement, or other status of each of one or more of a blockage, a nearby reflective surface, a repeater, etc.), or application parameters (which may include one or more of broadcast configuration, privacy concerns, security concerns, etc.). Techniques as described herein may be implemented with a view to optimizing beam width and power, for example, which may counteract one or more challenges as described above by, e.g., actively balancing coverage, throughput, and/or privacy of communication in a dynamic environment.

Potential advantages of such techniques may include any of the following: accommodating the traditional beam management framework that is used to refine narrow beams; enhancing the robustness of the network coverage; improving performance in the presence of reflective surfaces; optimizing performance according to the upper-layer application requirements. Uses of such techniques as described herein include, for example, an on-demand beam width control protocol and an on-demand joint beam width and power control framework, which may be integrated with an existing (e.g., 5G NR) power control loop.

Optimized beam width can significantly improve the performance of a communication system in many scenarios. For example, a beam misalignment may occur due to mobility of a node, such as a change in one or more of the node's speed, direction of movement, or orientation. The orientation of a UE (e.g., a smartphone, a wearable, a UAV, etc.) may change due to a rotation of the device, for example. When a beam misalignment occurs, using an optimized beam width can markedly enhance the coverage.

Figure 2:
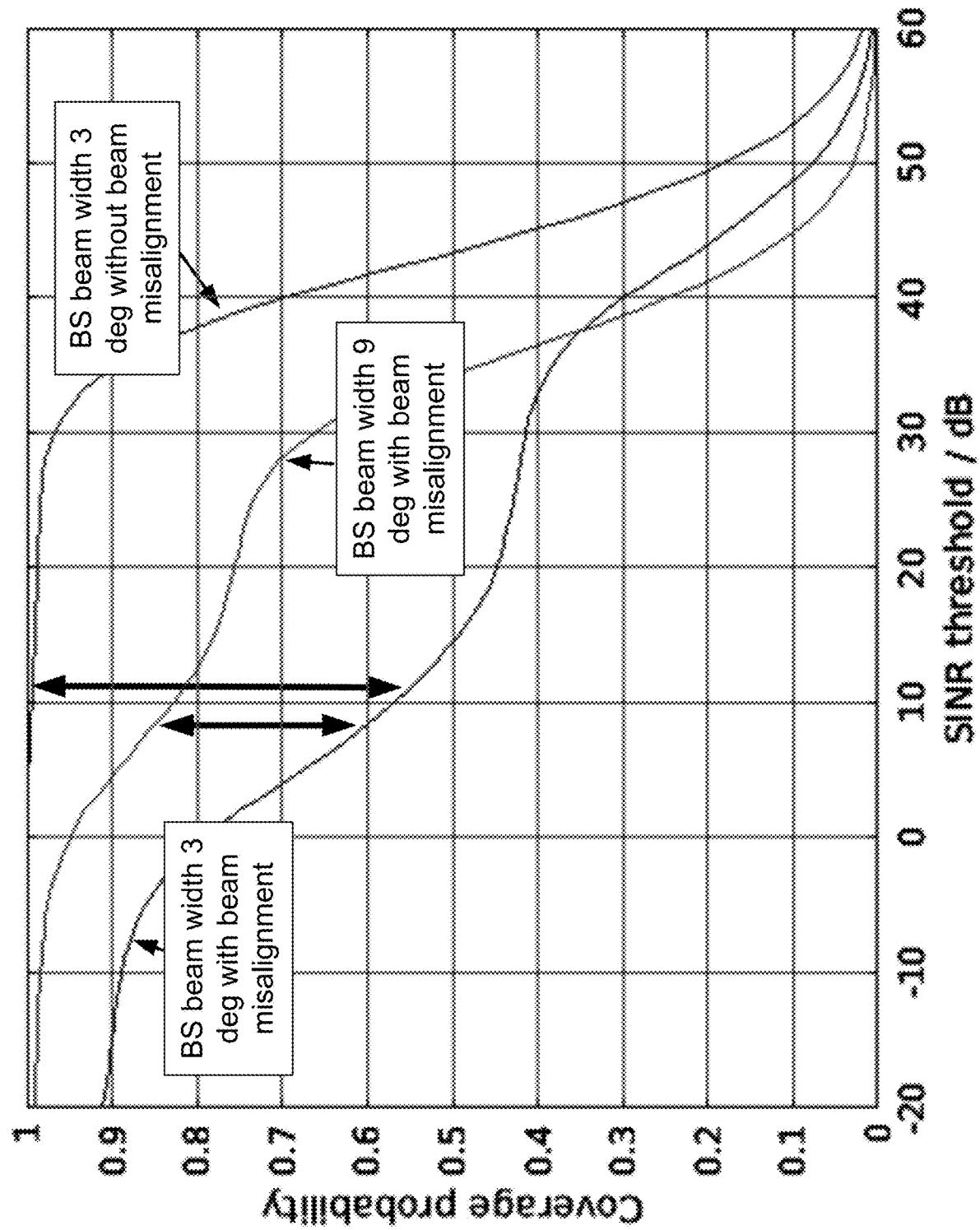
FIG. 2 illustrates a dependence of coverage probability on base station beam width in a terahertz (THz) network according to some embodiments.

FIG. 2 illustrates a dependence of coverage probability on BS beam width in a terahertz (THz) network and includes an example scenario in which optimized beam width can significantly mitigate a coverage probability loss due to beam misalignment. In this figure, the top curve represents a scenario without beam misalignment in which BS beam width is three degrees. The other two curves represent, respectively, a scenario with beam misalignment in which the BS beam width is also three degrees and a scenario with beam misalignment in which the BS beam width is nine degrees (in each of these two cases, the beam misalignment is randomly distributed over the range of from minus two degrees to plus two degrees). As shown in FIG. 2, given a certain SINR coverage threshold (e.g., 10 dB), the beam misalignment causes the coverage probability to decrease by more than 40% (difference indicated by long vertical range line). However, even in the presence of the beam misalignment, using a wider beam can recover much of this loss by increasing the coverage probability by about 25% (difference indicated by shorter vertical range line).

Figure 3:
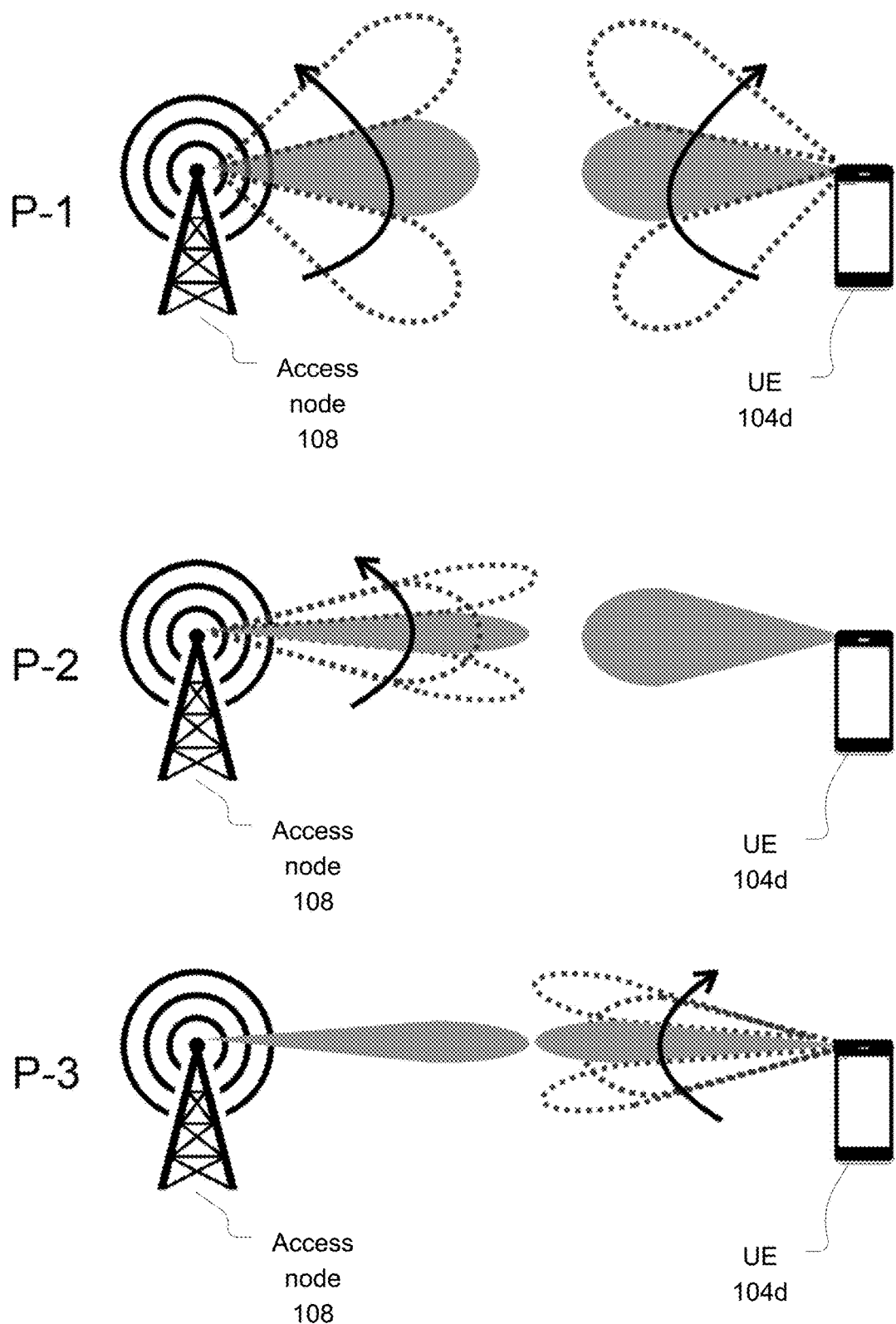
FIG. 3 illustrates examples of a P-1 process, a P-2 process, and a P-3 process.

Traditional beam management protocols usually support beam width refinement in a network-controlled manner. For example, section 6.1.6.1 of 3GPP Technical Report 38.802 ("3rd Generation Partnership Project; Technical Specification Group Radio Access Network; Study on New Radio Access Technology Physical Layer Aspects (Release 14)", v14.2.0 (2017 September)) describes a set of downlink L1/L2 beam management procedures for 5G NR that include a P-1 process, a P-2 process, and a P-3 process as depicted in FIG. 3. In the P-1 process, both the BS and the UE sweep through all their beams to determine an initial alignment. In the P-2 process, which occurs after the P-1 process has completed, the BS sweeps across a few narrow beams to identify a refined beam, and in the P-3 process, the BS causes the UE to do the same.

Such procedures may suffer from high protocol overhead and increased power consumption at both UE and BS when beam misalignment occurs. At least in most cases, executing the P-1, P-2, and P-3 processes leads only to narrower beams and does not lead to wider beams. Another potential shortcoming is that these procedures are controlled by the BS. As a result, they do not provide for link protection in scenarios that the BS does not detect. Such scenarios may include, for example, mobility of the UE, or a blockage or other effect in the environment local to the UE that causes a path loss.

A UE-initiated Beam Failure Recovery (BFR) protocol for 5G NR is described in sections 8.5.1 to 8.5.4 and 8.5.7 of 3GPP TS 38.133 ("5G; NR; Requirements for support of radio resource management (3GPP TS 38.133 version 17.5.0 Release 17)," v17.5.0 (2022 May)) and section 6 of 3GPP TS 38.213 ("5G; NR; Physical layer procedures for control (3GPP TS 38.213 version 17.2.0 Release 17)," v17.2.0 (2022 July)). According to this BFR protocol, after the UE has detected a beam failure (e.g., reference signal received power (RSRP) is lower than a threshold), the UE locally reselects the beams and reports the same to the BS. However, this 5G NR BFR protocol is reactive in nature and does not preempt link failure in an uncertain environment.

As mentioned above, narrow beams may be utilized in high-frequency bands to focus the power and compensate for the high path loss. However, when the propagation channel is dynamically changing due to mobility, rotation and/or blockage, using narrow beams can diminish the link robustness and thereby reduce network coverage, as illustrated in example scenarios of FIG. 4 to FIG. 6.

Figure 4:
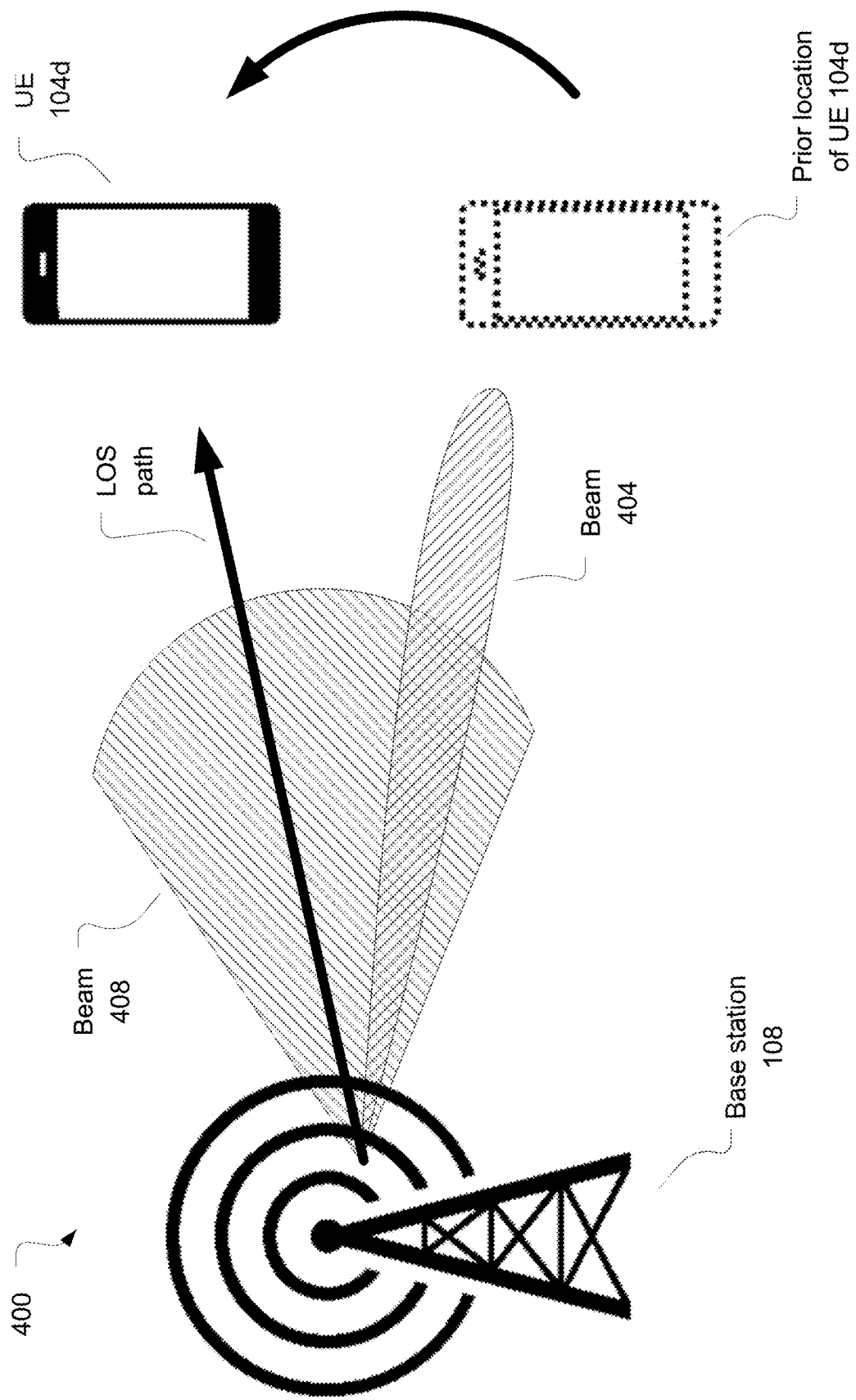
FIG. 4 shows a scenario in which a probability of beam failure due to a change in location of a UE is decreased according to some embodiments.

FIG. 4 shows a scenario in which the coverage is lost due to mobility of the UE 104*d*. At the beginning, the access node 108 serves the UE 104*d* with a narrow beam 404. When the UE 104*d* starts to move with a relatively high speed (e.g., in a car), it may travel beyond the coverage of the current beam before the next periodic or aperiodic beam measurement occurs, thereby resulting in a beam failure. Although 5G NR supports recovery from such beam failure using the BFR protocol, the re-selection process in this protocol can consume a lot of UE power and may also lead to service delays. However, if the BS uses a wider beam 408, as shown in FIG. 4, the probability of beam failure will decrease, thereby making the link more robust to mobility of the UE 104*d* (e.g., more tolerant of high UE speeds).

Figure 5:
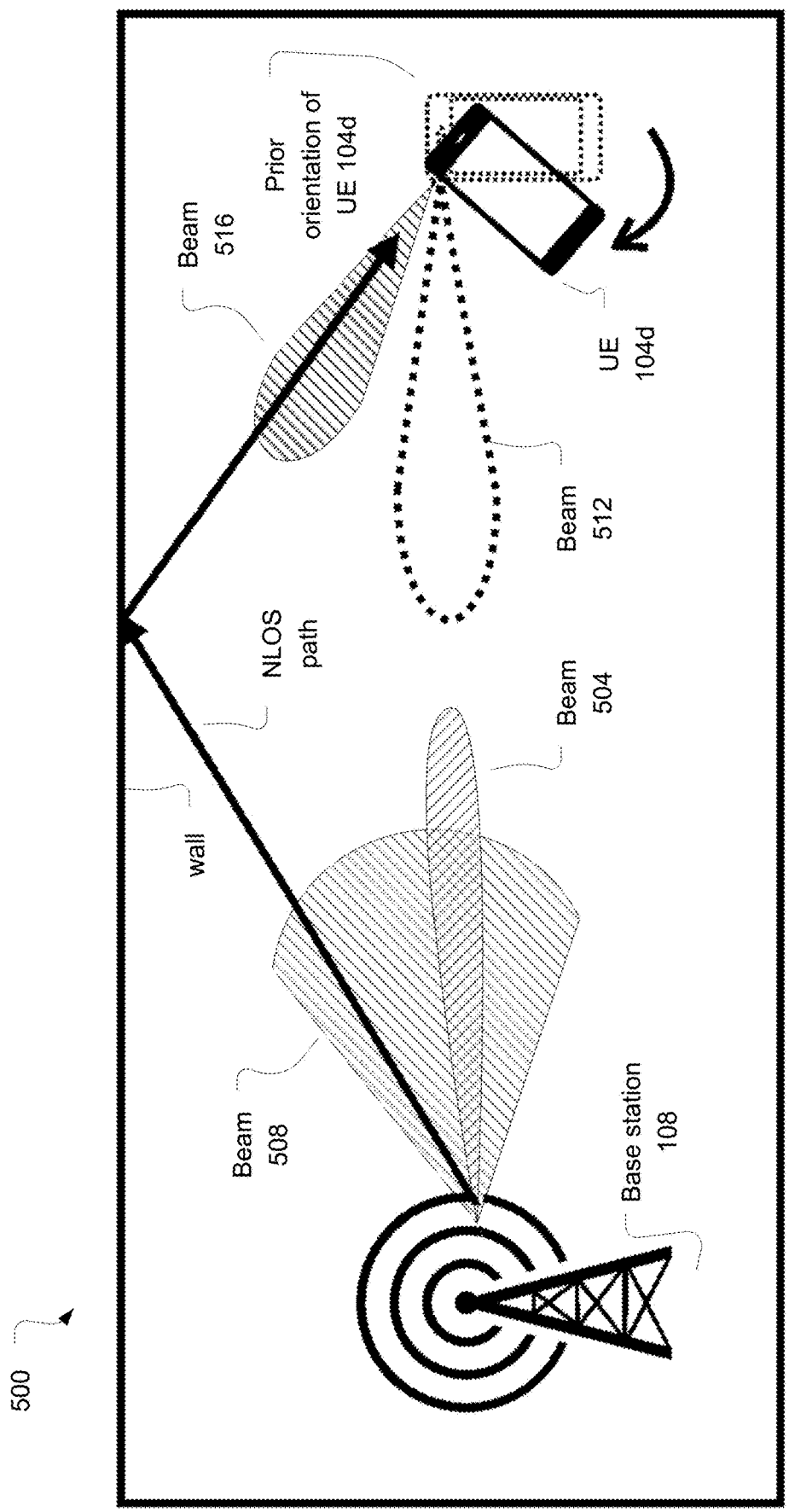
FIG. 5 shows a scenario in which a probability of beam failure due to a change in orientation of a UE is decreased according to some embodiments.

FIG. 5 shows a scenario in which coverage is lost due to a change in orientation (e.g., a rotation) of the UE 104*d* during use of narrow beams. An indoor environment, as shown in FIG. 5, usually contains rich non-line-of-sight (NLOS) multipath components, which are likely to be weaker than the corresponding line-of-sight (LOS) component. When a LOS path is available for a static UE 104*d*, a typical strategy is to align the narrow beams on both BS and UE sides (beams 504 and 512) along the LOS path to provide the optimal data rate. A sudden rotation of the UE 104*d* can markedly misalign the UE and BS beams 504 and 512, thus causing a beam failure as shown in the figure. However, within a rich multi-path environment, there is still a considerable probability that the misaligned UE beam 516 points to some scatterer or reflective surface (e.g., a wall) that may provide an NLOS path, and the misalignment probability may be reduced by using a wider beam 508 at the access node 108. In this scenario, the wider BS beam 508 may be able to provide coverage for such NLOS path. Although the total channel gain of the NLOS path and the wide beam 508 may be lower than that of a LOS path with a narrow beam 504, the link can still support some low-rate services instead of having a complete outage.

Figure 6:
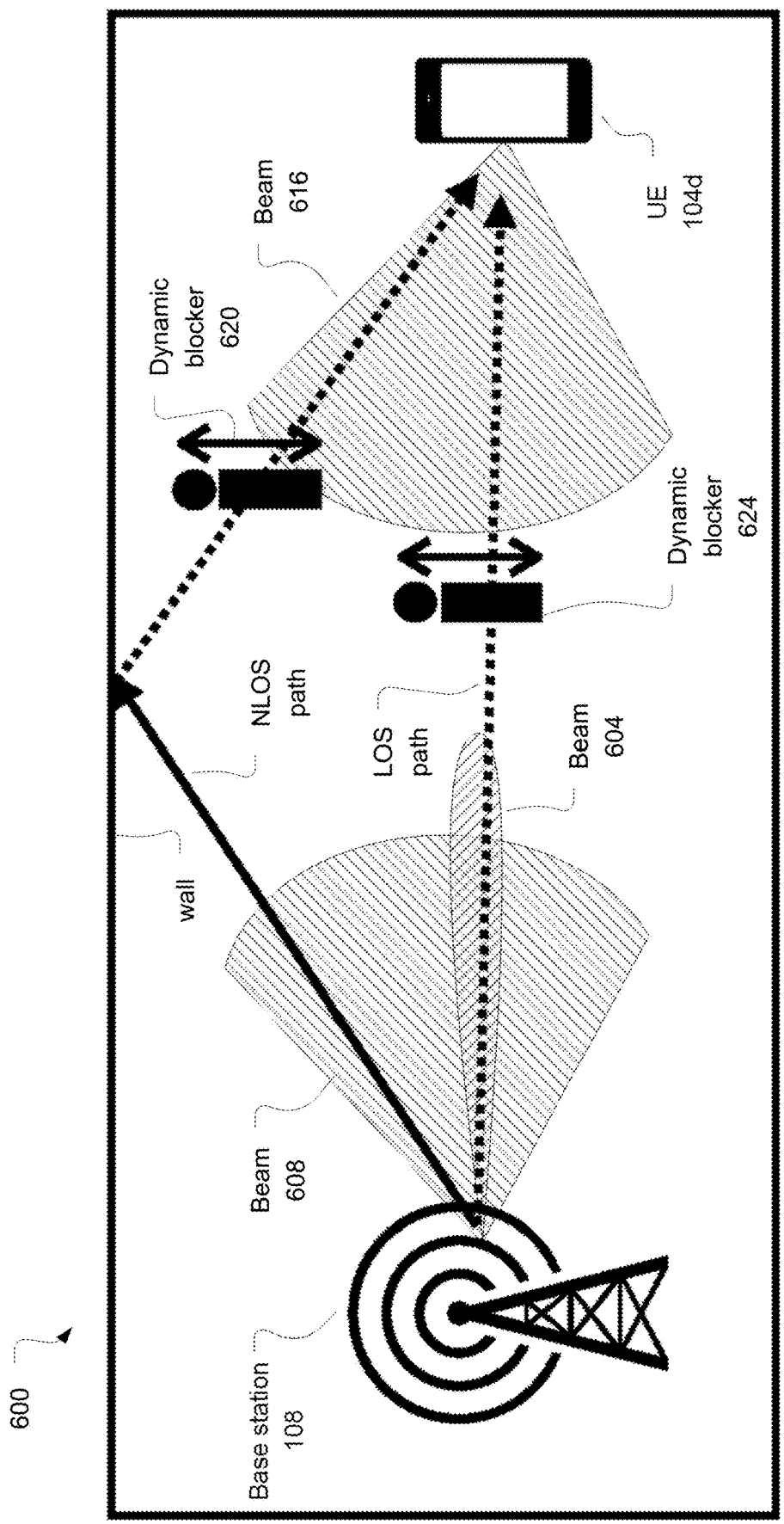
FIG. 6 shows a scenario in which a probability of beam failure due to dynamic blockage is decreased according to some embodiments.

FIG. 6 shows a scenario in which the coverage may be lost due to dynamic blockages during use of narrow beams (e.g., beam 604). It is known that high-frequency signals suffer from high penetration loss when traveling through blockers, such as a human body. When blockage happens in an indoor environment with rich multi-paths, potential NLOS paths may exist around the blockers that can be exploited to maintain connectivity. However, exploitation of such NLOS paths may require a frequent change of beams when the beams are narrow and blockers are continuously moving (e.g., people moving along a corridor, moving cars traveling on a busy road), which can increase UE power consumption. Employing a wider beam at each node (e.g., beam 608 at the access node 108, beam 616 at UE 104*d*) can help cover the directions of multiple paths at once. For example, in a scenario as shown in FIG. 6, even if the LOS path is suddenly blocked by a dynamic blocker 624, the access node 108 can still transmit data to the UE 104*d* with a lower rate via NLOS paths using the same wide beam 608, which in turn reduces probability of link outage. Wider beams also allow for use of the same beams is a changing environment: for example, as movement of dynamic blockers 620, 624 causes the availability of individual multipaths within the beam coverage to change over time.

The example scenarios in FIG. 4 to FIG. 6 demonstrate cases of reduced link robustness due to use of narrow beams in current communication systems. Techniques as described below may be implemented to support dynamic control of beam width according to transmission/reception demands. In general, the adjustment of beam width according to such techniques may be applied to any arbitrary set of devices that form a communications link (e.g., a pair of nodes, where each node of the pair may be any of a BS, a UE, an unmanned aerial vehicle (UAV) (e.g., a drone), a satellite, etc.).

In one example, a technique for beam width control includes, at a transmitting node, determining a transmit beam width based on information from a receiving node. Such information may include, for example, mobility information of the receiving node (e.g., orientation, speed, or direction of movement). Such a technique may provide increased robustness for cases in which such mobility of the receiving node might otherwise lead to link failure (e.g., as in scenarios as described above with reference to FIGS. 4 and 5).

The information from the receiving node may be based on information collected from one or more sensors of the receiving node. For example, the one or more sensors may include one or more accelerometers or gyroscopes (e.g., one or more gyrometers) of the receiving node, which may be included in an inertial measurement unit (IMU). The information from the receiving node may also include information from other sensors (e.g., information from an image captured by a camera) and/or information from an application (e.g., a mapping application). The information may be received in an information element and/or in a message (e.g., in an uplink control information (UCI) or downlink control information (DCI) message). The receiving node providing its mobility information may be a UE (e.g., smartphone, wearable, UAV, etc.) or an access point (e.g., an access node or BS, which may be earth-bound or on a non-terrestrial (NTN) platform, such as a satellite or airborne platform).

Additionally or alternatively, determining the transmit beam width may be based on a location of a blockage or a direction of movement of the blockage, which may also be indicated by the receiving node or may be otherwise determined from the information from the receiving node. Such a technique may provide increased robustness for a dynamic blockage scenario (e.g., as described above with reference to FIG. 6). In either case, the receiving node may request a beam width change by the transmitting node, and this request may be based on knowledge of the transmitting node's current beam configuration. The transmitting node may change its transmission power in accordance with the beam width change.

Figure 7:
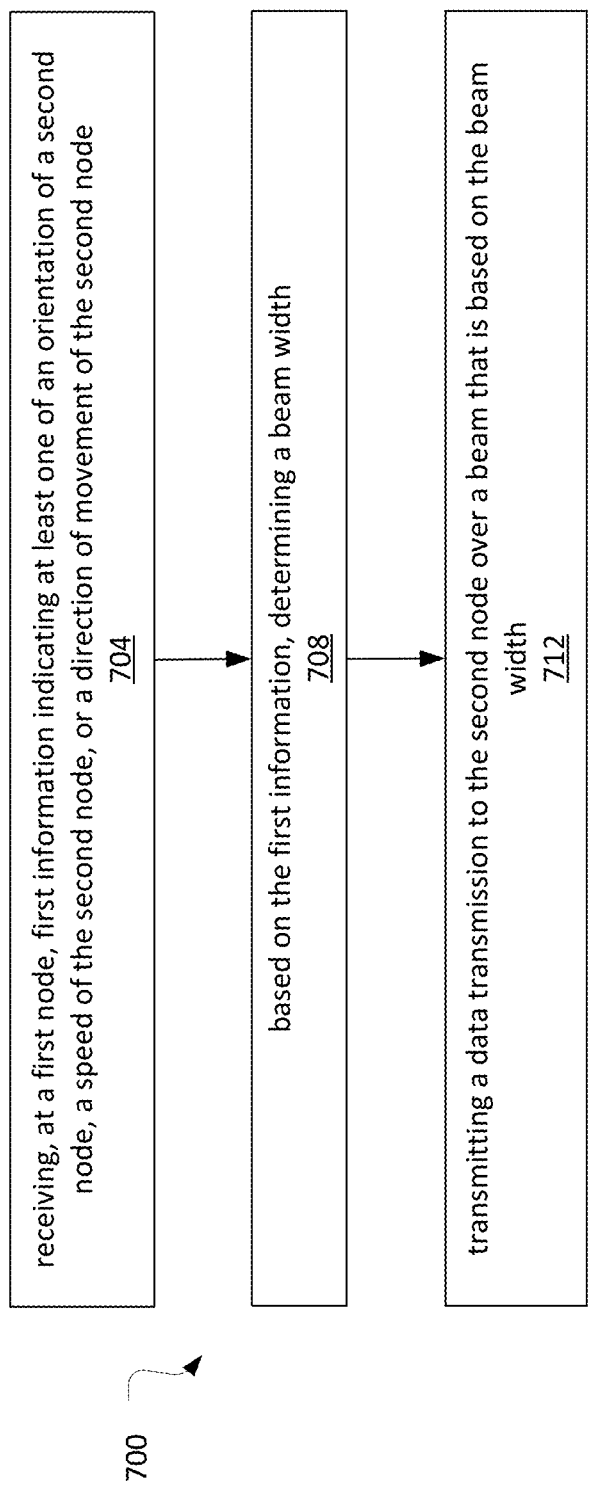
FIG. 7 illustrates an operational flow/algorithmic structure in accordance with some embodiments.

FIG. 7 illustrates an operation flow/algorithmic structure 700 in accordance with some embodiments. The operation flow/algorithmic structure 700 may be performed or implemented by a UE, such as, for example, any of UEs 104*a*-104*e*; or components thereof, for example, baseband processor 2404A. The operation flow/algorithmic structure 700 may be performed or implemented by an access node, such as, for example, base station 108 or 112, or other access point; or components thereof, for example, baseband processor 2504A.

The operation flow/algorithmic structure 700 may include, at 704, receiving first information indicating at least one of an orientation of a second node, a speed of the second node, or a direction of movement of the second node. The first information may also indicate, for example, at least one of a location of a blockage or a direction of movement of the blockage.

The operation flow/algorithmic structure 700 may include, at 708, based on the first information, determining a beam width. Determining the beam width may also be based on at least one of a location of a blockage or a direction of movement of the blockage. Additionally or alternatively, determining the beam width may be based on second information from an image captured by a camera.

The operation flow/algorithmic structure 700 may include, at 712, transmitting a data transmission to the second node over a beam that is based on the beam width. A transmission power of the data transmission may be based on the beam width. The operation flow/algorithmic structure 700 may also include, based on the beam width, obtaining a beamforming configuration from a codebook. Additionally or alternatively, the operation flow/algorithmic structure 700 may also include generating a request that indicates a requested beam width change, wherein the requested beam width change may be based on third information that indicates a beam configuration of the second node.

Optimization of the beam widths used for a link may depend upon consideration of the demands of both end nodes in a timely manner. While a signaling protocol which allows the transmitting and receiving nodes to exchange requests might be used for this purpose, such a protocol is not currently supported. As opposed to current beam management protocols, it may be desired for such a protocol to accommodate bidirectional beam width control requests. For example, it may be desired for the protocol to allow both the transmitting node and the receiving node to adjust each other's beam width according to local information, which may not otherwise be available at the other node. The adjustment of beam width may change beamforming gains, and it may be desired to address such changes by integrating power control into the protocol.

Techniques described herein include, for example, an on-demand beam width control framework for robust coverage, an on-demand beam width control protocol, a general on-demand beam width and power control framework, and a joint on-demand beam width and power control protocol. Such techniques are generally applicable to all of the various coverage scenarios presented herein, and an existing approach in which coarse beams are refined to create narrow beams to provide high throughput can also be supported by such protocols.

Figure 8:
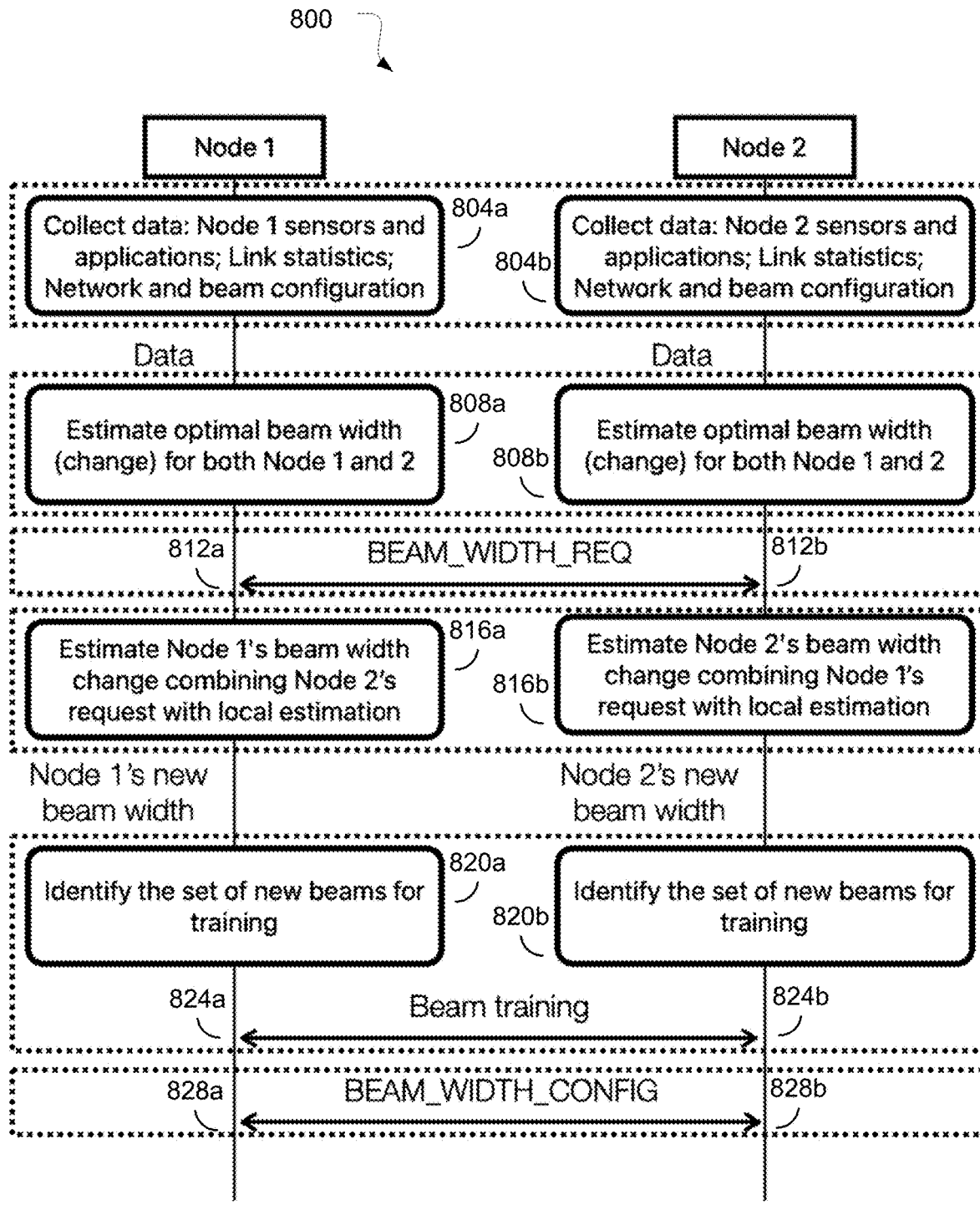
FIG. 8 shows a message sequence chart of a process for beam width control in accordance with some embodiments.

FIG. 8 shows a message sequence chart (MSC) of a process 800 for beam width control. Such a process, which is described below in the context of a link between a Node 1 and a Node 2 (where each node may be a BS, UE, or any other node described herein), may utilize a protocol that supports bi-directional on-demand beam width control requests.

In block 804a, Node 1 collects data to be used for beam width estimation. Such data may include, for example, any of the following: link statistics (e.g., one or more of reference signal received power (RSRP), reference signal received quality (RSRQ), or signal to interference noise ratio (SINR)); the beam configuration (e.g., beam width) of the other node; and information from Node 1's own sensors and/or applications. The sensors from which information is collected may include one or more accelerometers and/or gyroscopes (e.g., a gyrometer), which may provide basic geometric information such as location, speed and orientation. The sensors from which information is collected may also include sensors that capture image or other information, such as a camera. The applications from which information is collected may include, for example, a geographical mapping application (e.g., Apple Maps). Node 1 may use the sensor and/or application information thus collected to identify mobility patterns and/or blockages that may influence the beam width selection. Node 1 may be configured to continuously collect such data (e.g., by responding to interrupts generated by a sensor or alerts generated by an application; by polling a sensor or application at regular intervals; etc.). In block 804b, Node 2 may collect data to be used for beam width estimation in the same manner, given, for example, its own link statistics, sensors, and applications; the beam configuration (e.g., beam width) of Node 1; etc.

In block 808a, Node 1 locally estimates an optimal beam width for itself and an optimal beam width for Node 2. Such beam width estimation may be based on information that is inferred from the collected data, such as, for example, mobility pattern, blockages, etc. In one example, a UE implementation of Node 1 calculates an optimal beam width for a BS implementation of Node 2 given its own speed, distance to the BS, and measured RSRP. In block 808b, Node 2 may likewise locally estimate an optimal beam width for itself and an optimal beam width for Node 1.

If Node 1 has determined that the beam width of Node 2 should be adjusted, then in block 812a, Node 1 sends a beam width control request, BEAM_WIDTH_REQ, to Node 2 to adjust the beam width. Likewise, if Node 2 has determined that the beam width of Node 1 should be adjusted, then in block 812b, Node 2 sends a beam width control request, BEAM_WIDTH_REQ, to Node 2 to adjust the beam width. The BEAM_WIDTH_REQ signal indicates the beam width change being requested (e.g., as an angle), and examples of a corresponding signal format for such a request are presented below.

After receiving the request from Node 1, Node 2 estimates its final beam width change in block 816b by combining the beam width change requested by Node 1 with Node 2's own local estimation from block 808b. For example, Node 2 may estimate its final beam width change as the maximum of these two values or, alternatively, as an average (e.g., the geometric mean) of the two values. In block 816a, Node 1 estimates its new beam width in a similar manner.

In block 820a, Node 1 determines its beam set for selection, and in block 820b, Node 2 determines its beam set for selection. In blocks 824a and 824b, the two nodes schedule a beam training process with each other, in which new beam pairs will be selected and used for future data transmission.

In blocks 828a and 828b, each node sends a feedback signal, BEAM_WIDTH_CONFIG, to the other node to confirm the successful beam width adjustment and to indicate its new beam configuration. If the beam width control process 800 is performed in an asymmetric manner (for example, if only Node 1 will change its beam width), the same protocol can be employed, with the signals sent by Node 2 indicating "no change."

The beam width control process 800 may be performed in parallel with an existing beam tracking protocol. In such case, when a node receives a beam width control request, it can conduct beam measurement with the updated beam widths. On the other hand, since the process 800 also configures a beam training process, this training process may be used to track the beamforming directions in a timely manner and switch beams accordingly.

The two signals BEAM_WIDTH_REQ and BEAM_WIDTH_CONFIG may be used to regulate a beam width control protocol as described above with reference to process 800. The signal BEAM_WIDTH_REQ indicates the requested beam width change value, and FIGS. 9A and 9B show two nonlimiting examples of a format for this signal. FIG. 9A shows a table of beam width change values as indicated by the signal BEAM_WIDTH_REQ for an example in which BEAM_WIDTH_REQ is implemented as a four-bit signal $b_0b_1b_2b_3$, and FIG. 9B shows a table of beam width change values as indicated by the signal BEAM_WIDTH_REQ for an example in which BEAM_WIDTH_REQ is implemented as a three-bit signal $b_0b_1b_2$. In these tables, the beam width changes indicate angles in degrees, where positive values denote a corresponding increase in the beam width and negative values denote a corresponding decrease in the beam width.

The gnal BEAM_WIDTH_CONFIG indicates the status of the beam width adjustment and the current beam width (after the beam width adjustment) in degrees used, and FIGS. 10A and 10B show two nonlimiting examples of a format for this signal. FIG. 10A shows a table of beam width values as indicated by the signal BEAM_WIDTH_CONFIG for an example in which BEAM_WIDTH_CONFIG is implemented as a four-bit signal $c_0c_1c_2c_3$, and FIG. 10B shows a table of beam width values as indicated by the signal BEAM_WIDTH_CONFIG for an example in which BEAM_WIDTH_CONFIG is implemented as a three-bit signal $c_0c_1c_2$. In these tables, the beam width values indicate angles in degrees, and the values $c_0c_1c_2c_3$=0000 and $c_0c_1c_2$=000 indicate a failure in beam width adjustment. Such a failure may occur due to, for example, codebook design, power control, etc.

Figure 11:
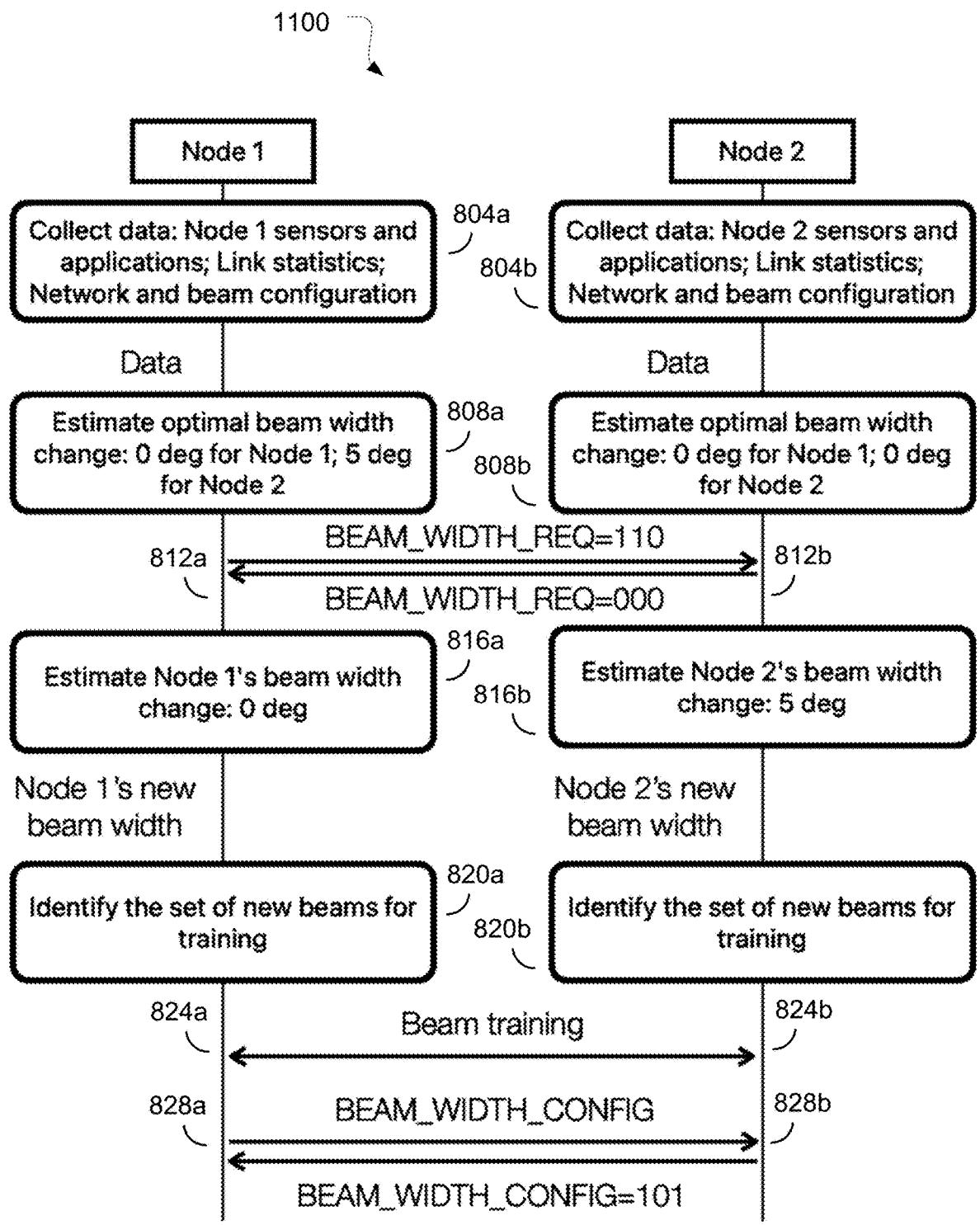
FIG. 11 shows a message sequence chart of an example of a process for beam width control in accordance with some embodiments.

FIG. 11 show an MSC for an example 1100 of process 800 in which an on-demand beam width control protocol as shown in FIG. 8 is applied to a scenario that begins with Node 2 transmitting to Node 1 using an initial beam width of four degrees. At block 808*a*, Node 1 estimates that Node 2 should increase its beam width by five degrees in order to improve the link robustness to Node 1's mobility. At block 808*b*, Node 2 determines that no change to Node 1's current beam width is needed, based on its information collected. At block 812*a*, Node 1 sends BEAM_WIDTH_REQ=110 to Node 2 using the 3-bit signal format, and at block 812*b*, Node 2 sends BEAM_WIDTH_REQ=000. At block 816*a*, Node 1 estimates that no change is needed to its own beam width, and at block 816*b*, Node 2 estimates a beam change to its beam width of five degrees. Node 2 increases its own beam width by about five degrees via scheduled beam training at block 824*b* and sends a feedback signal BEAM_WIDTH_CONFIG=101 to Node 1 at block 828*b*. The beam width change as applied by a node may differ from the beam width change as estimated by the node (and/or the beam width change as requested by the other node) due to factors such as the node's beamforming architecture, the node's codebook design, etc., which may determine the particular beam width values that may actually be implemented at the node.

A protocol as described above with reference to FIGS. 8-11 may be implemented to support on-demand beam width control request signals, which may allow a transmitting node and a receiving node to jointly optimize their beam widths together to improve the link quality in a timely manner. Importantly, the beam width control request in such a protocol does not disclose any private data of each node (e.g., location, mobility status, etc.) to the other node. Such a protocol may also be implemented sufficiently generally to support beam width control based on service and application demands. Further, the beam width control protocol may be implemented to be bi-directional and may thus support almost any type of links (e.g., BS-UE uplink (UL)/downlink (DL); device-to-device (D2D) side links; UAV links, satellite links, etc.). In an example scenario in a cellular network, such bidirectionality may enable the UEs to adjust the network beam settings according to the UEs' own demands, making such a protocol an important component for a UE-centric/service-centric network architecture.

Figure 12:
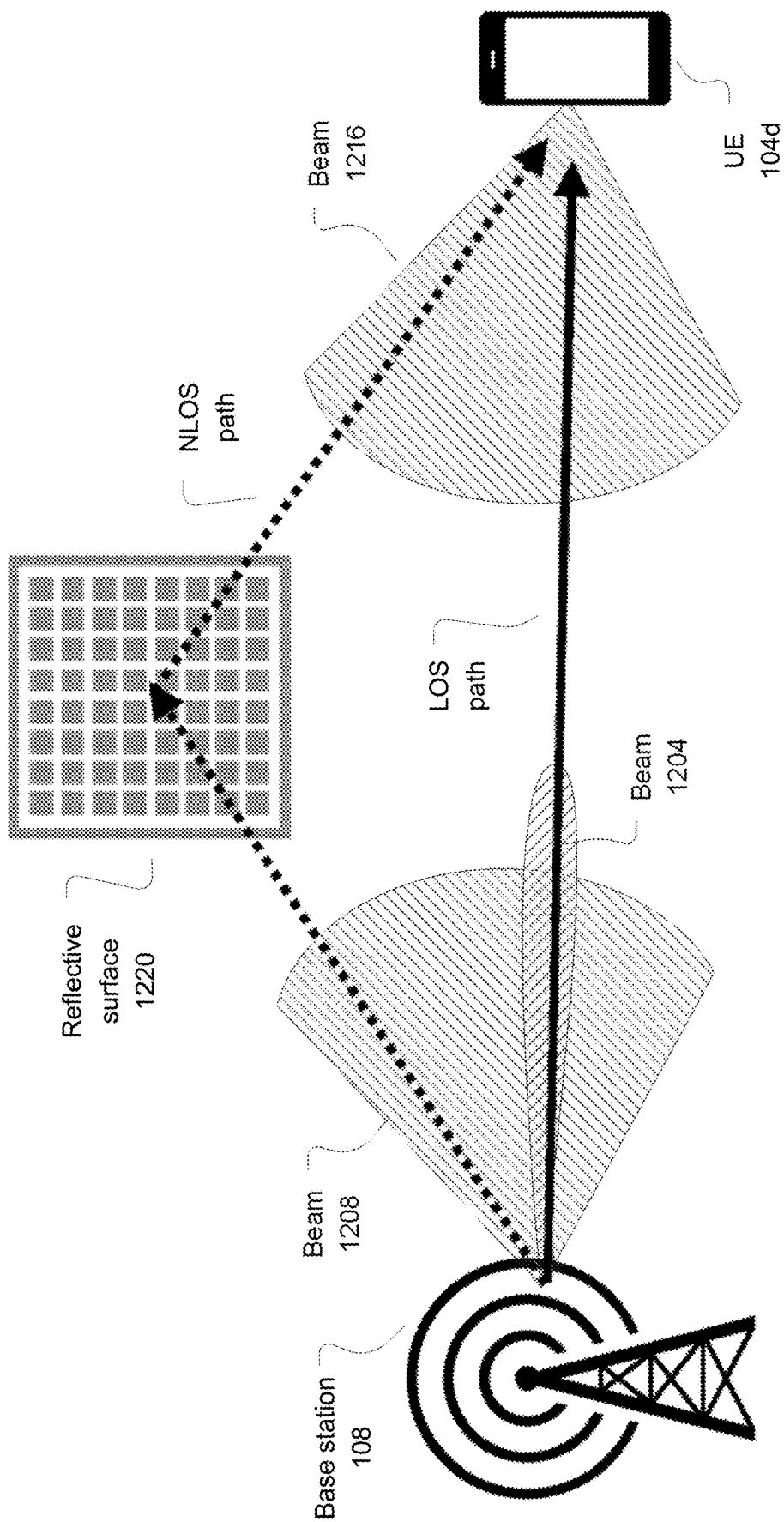
FIG. 12 shows a scenario that includes a presence of a reflective surface according to some embodiments.

Techniques for beam width control as discussed herein (e.g., with reference to FIGS. 7-11) may also be used in the presence of reflective surfaces. As shown in the example of FIG. 12, a reflective surface 1220 may configure a propagation environment by providing extra paths. A reflective surface 1220 may be deployed indoors (e.g., mounted on a wall, behind a painting, at the corner of two corridors, etc.) or outdoors (e.g., on the side of a building, at an intersection, etc.) and may provide a reflective channel (e.g., a NLOS path via the reflective surface 1220) where no LOS path exists. Such a surface may be implemented as a phased antenna array which is passive but may be programmable or otherwise reconfigurable (e.g., a reconfigurable intelligent surface (RIS)). For example, a BS may program a RIS by sending a set of programmable weights (e.g., over a side channel, such as LTE) to a controller (e.g., a microcontroller) of the RIS, which then configures the array according to the weights.

Figure 13:
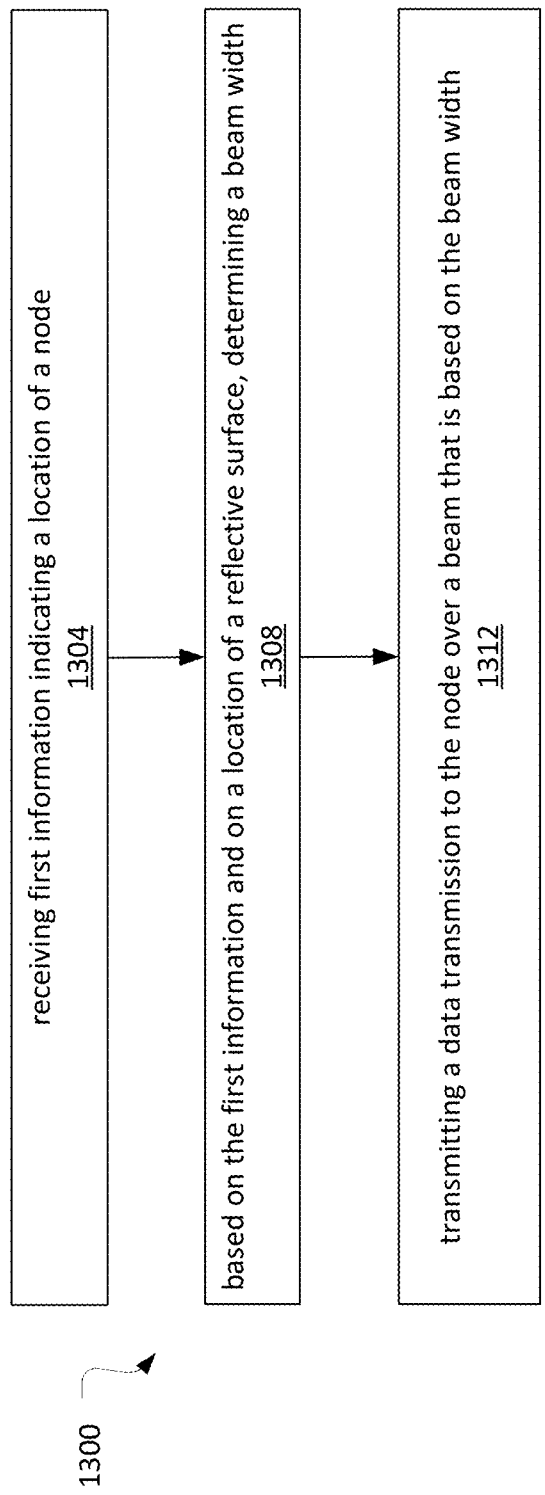
FIG. 13 illustrates an operation flow/algorithmic structure in accordance with some embodiments.

FIG. 13 illustrates an operation flow/algorithmic structure 1300 in accordance with some embodiments. The operation flow/algorithmic structure 1300 may be performed or implemented by a UE, such as, for example, any of UEs 104*a*-104*e*; or components thereof, for example, baseband processor 2404A. The operation flow/algorithmic structure 1300 may be performed or implemented by an access node, such as, for example, base station 108 or 112; or components thereof, for example, baseband processor 2504A.

The operation flow/algorithmic structure 1300 may include, at 1304, receiving first information indicating a location of a node.

The operation flow/algorithmic structure 1300 may include, at 1308, based on the first information and on a location of a reflective surface, determining a beam width. Determining the beam width may be based on a configuration of the reflective surface. The reflective surface may be a reconfigurable intelligent surface (RIS). The operation flow/algorithmic structure 1300 may also include receiving second information indicating at least one of an orientation of the node, a speed of the node, or a direction of movement of the node, and determining the beam width may be based on the second information.

The operation flow/algorithmic structure 1300 may include, at 1312, transmitting a data transmission to the node over a beam that is based on the beam width. A transmission power of the data transmission may be based on the beam width. The operation flow/algorithmic structure 1300 may also include, based on the beam width, obtaining a beamforming configuration from a codebook. Additionally or alternatively, the operation flow/algorithmic structure 1300 may also include receiving an incoming data transmission from the node, and transmitting, to the node, a request that indicates a requested beam width change. For example, the operation flow/algorithmic structure 1300 may include generating a request that indicates a requested beam width change, wherein the requested beam width change may be based on third information that indicates a beam configuration of the node.

When both the LOS channel and a reflective channel are available, sending the signal through both channels simultaneously can enhance the signal strength and provide orthogonality. As shown in FIG. 12, wide beams 1208 and 126 may be used to send signals over both channels, which may not be feasible when a narrow beam 1204 is utilized. One challenge to enabling wide beams is that in some situations, only one of the nodes is aware of the reflective surface. For example, an access point (e.g., the access node 108) may know the location of the reflective surface, but a UE 104d may lack such information. The node that is aware of the reflective surface may use one or more techniques as described above with reference to FIGS. 8-11 (e.g., the on-demand beam width control protocol) to overcome this information gap by requesting the other node to adjust its beam width accordingly. Thus, nodes may also use the presence of reflective surfaces for initiating beam width adjustment.

Figure 14:
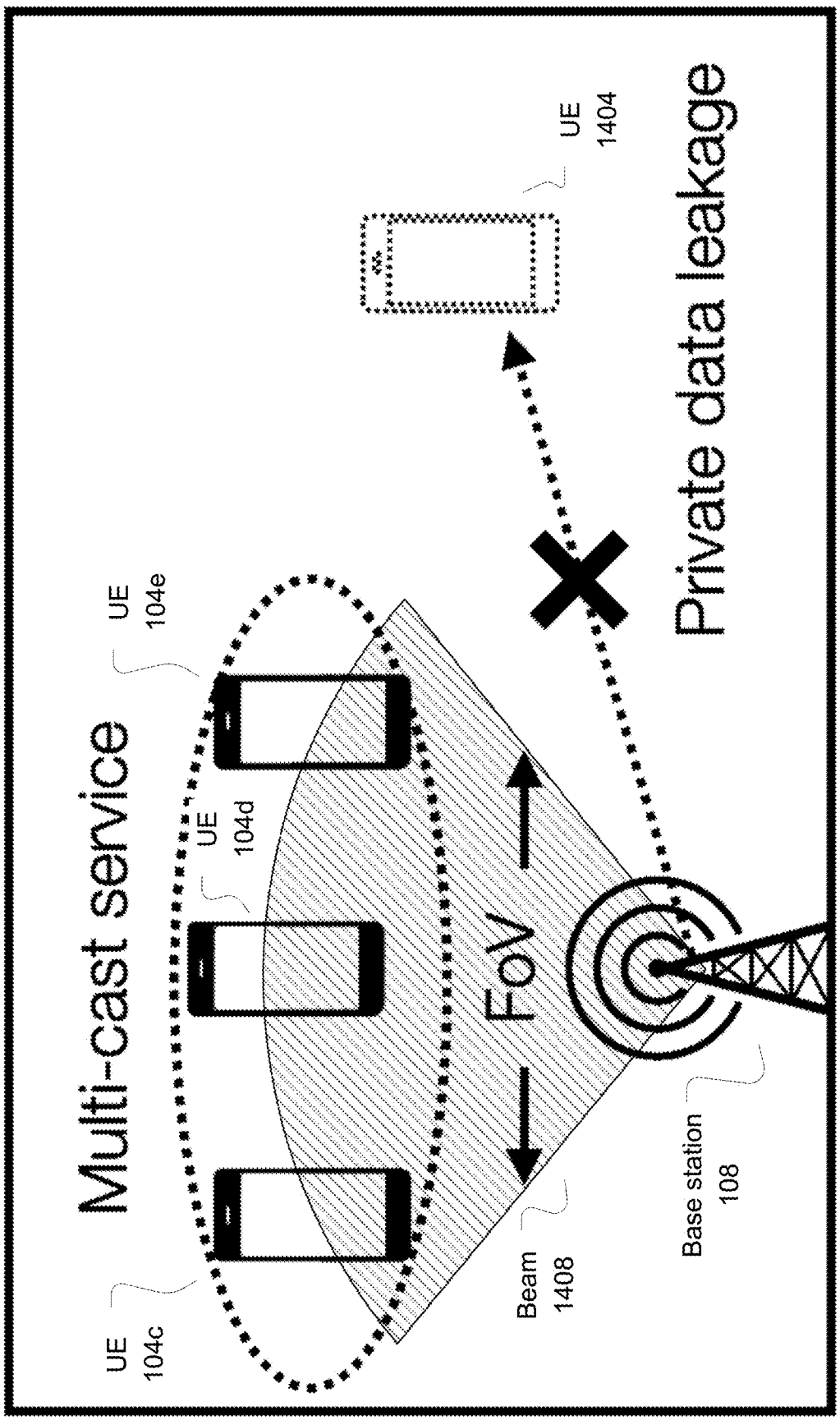
FIG. 14 illustrates an example scenario in which a base station is serving multiple user equipments in a given space in accordance with some embodiments.

Techniques for beam width control as discussed herein (e.g., with reference to FIGS. 7-11) may also be used to address upper-layer requirements (e.g., from applications/ services). FIG. 14 illustrates an example scenario in which the access node 108 is serving multiple UEs 104c-104e in a given space (e.g., a room, a lecture hall, a concert venue) by distributing the same data (e.g., a video conference) to all of the UEs 104c-104e. In this case, the data is not to be distributed to any other UEs 1404, and hence a secure multi-cast service with optimized beam width to preserve privacy may be desired. Using the location information of the served UEs 104c-104e and dimensions of the given room, the access node 108 may construct a suitable wide beam 1408 for multi-casting to all the UEs 104c-104e. In one example, the UEs 104c-104e may communicate with side links first to gather (e.g., aggregate) their location information, which may then be shared with the access node 108 by one or more of the UEs 104c-104e. Such a wide multi-cast beam can also help to avoid possible data theft by UEs 1404 outside of the Field of View (FoV) of beam 1408. It may also be desired to configure the access node 108 to limit the transmission power of beam 1408 to avoid leakage beyond the given space (e.g., as indicated by the locations of the UEs 104c-104e). An on-demand beam width control protocol as described above (e.g., with reference to FIGS. 8-11) may be applied to the scenario as illustrated in FIG. 14 as well.

Figure 15:
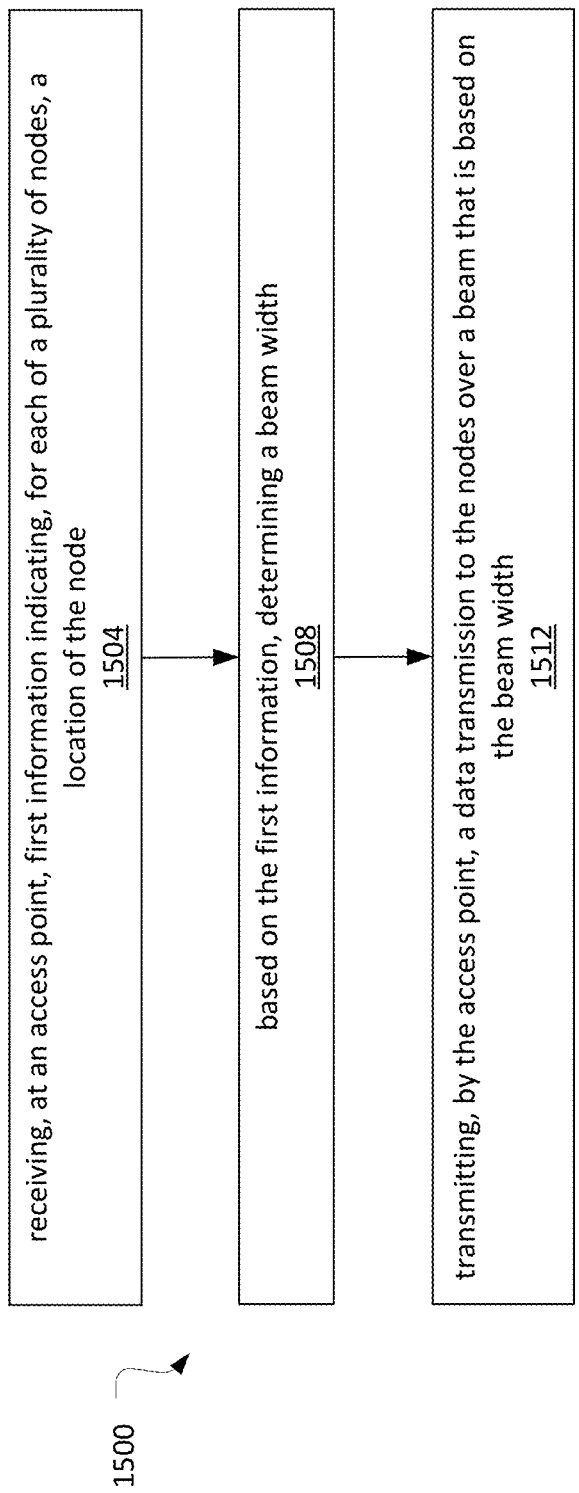
FIG. 15 illustrates an operation flow/algorithmic structure in accordance with some embodiments.

FIG. 15 illustrates an operation flow/algorithmic structure 1500 in accordance with some embodiments. The operation flow/algorithmic structure 1500 may be performed or implemented by an access node, such as, for example, base station 108 or 112, or other access point; or components thereof, for example, baseband processor 2504A.

The operation flow/algorithmic structure 1500 may include, at 1504, receiving, at an access point, first information indicating, for each of a plurality of nodes, a location of the node. Receiving the first information may include receiving the first information from one among the plurality of nodes.

The operation flow/algorithmic structure 1500 may include, at 1508, based on the first information, determining a beam width. Determining the beam width may be based on a location of a reflective surface (e.g., a reconfigurable intelligent surface (RIS)).

The operation flow/algorithmic structure 1500 may include, at 1512, transmitting, by the access point, a data transmission to the nodes over a beam that is based on the beam width. A transmission power of the data transmission may be based on the first information. The operation flow/ algorithmic structure 1500 may also include, based on the beam width, obtaining a beamforming configuration from a codebook.

Current communication systems (e.g., 5G NR) typically support a closed loop power control scheme to combat path loss, fading, and interference. Integration of a beam width control protocol as described herein (e.g., with reference to FIGS. 8-11) and an existing (e.g., 5G NR) power control protocol is not trivial, as changing beam width can significantly affect the received signal power.

Figure 16:
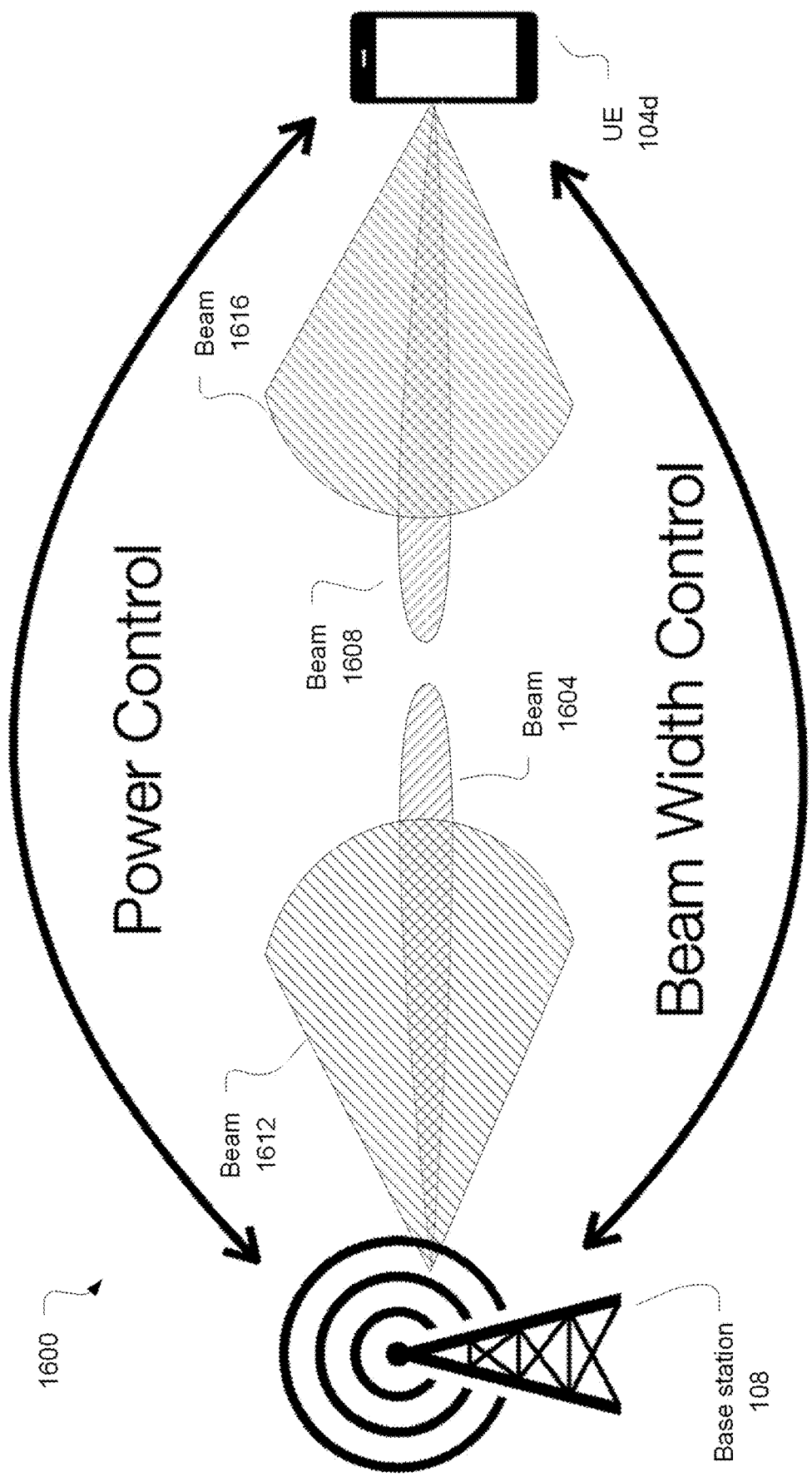
FIG. 16 illustrates an example of a joint loop of power control and beam width control in accordance with some embodiments.

FIG. 16 illustrates an example of a joint loop of power control and beam width control, in which both the access node 108 and UE 104d control each other's transmission power for DL/UL transmission, while both devices request to control the beam width of each other at the same time to enhance the link robustness. Using a wider BS/UE beam (e.g., changing from beam 1604 to beam 1612 at the access node 108, changing from beam 1608 to beam 1616 at UE 104d) will lead to a SNR loss in this scenario. To maintain the quality of the link, it may be desired to increase the transmission power to compensate for reduction in beamforming gain caused by the increase in beam width. In one example, the transmission power is increased according to the relative change in beam width. In such a case, the change in transmission power may be obtained from a table of gain values that is indexed by the relative change in beam width (e.g., by the value of (new beam width)/(old beam width)). In another example, a joint beam width and power control loop as described below (e.g., a joint loop of beam width and transmission power control protocol) may be used.

Figure 17:
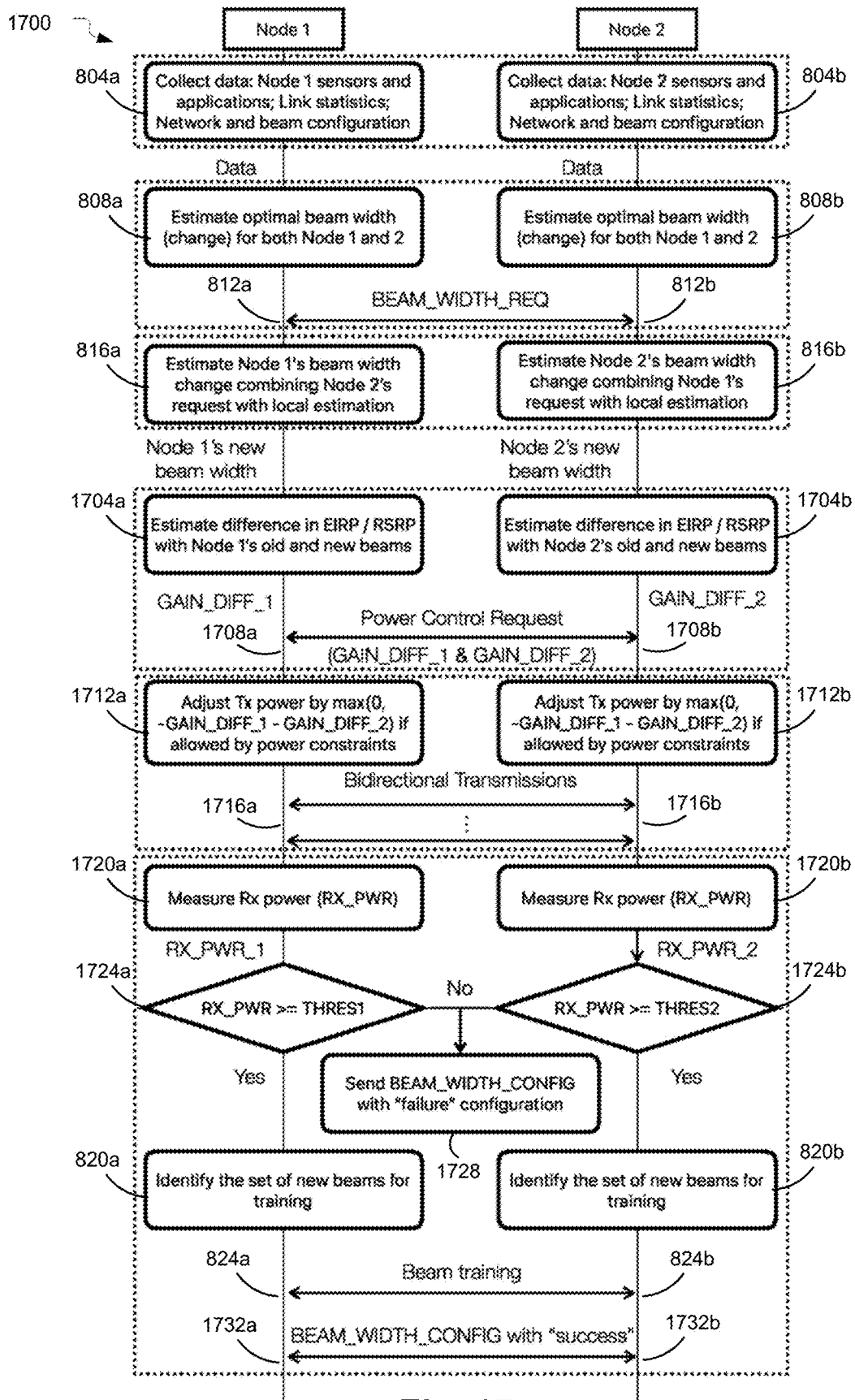
FIG. 17 shows a message sequence chart of a process for joint beam width and transmission power control in accordance with some embodiments.

FIG. 17 shows a MSC of a process 1700 for joint beam width and transmission power control. Such a process, which is described below in the context of a link between a Node 1 and a Node 2 (where each node may be a BS, UE, or any other node described herein), may utilize a protocol that supports a joint loop of bi-directional on-demand beam width requests and transmission power control. In the example of FIG. 17, both Node 1 and Node 2 request beam width control for each other, and meanwhile both nodes control the DL/UL power to maintain the same link quality before and after beam width adjustment.

Process 1700 includes blocks 804a, 804b, 808a, 808b, 812a, 812b, 816a, and 816b of process 800 for beam width control as described above with reference to FIG. 8. In process 1700, after block 816a, Node 1 has estimated its new beam width, and after block 816b, Node 2 has estimated its new beam width.

In block 1704a, based on its old and new beam width, Node 1 estimates the difference in effective isotropic radiated power (EIRP) and/or RSRP that will result from the change of beamforming gain. Similarly, in block 1704a, based on its old and new beam width, Node 2 estimates the difference in EIRP and/or RSRP that will result from the change of beamforming gain. In block 1708a, Node 1 sends the estimated power difference to Node 2 as a value GAIN_DIFF_1, and in block 1708b, Node 2 sends the estimated power difference to Node 1 as a value GAIN_DIFF_2. In this manner, Node 1 and 2 may exchange GAIN_DIFF_1 and GAIN_DIFF_2 values via bi-directional power control requests to indicate the estimated end-to-end EIRP/RSRP difference with the proposed new beam widths.

In blocks 1712a and 1712b, respectively, each of Nodes 1 and 2 adjusts its transmission power (for DL/UL transmissions separately) by the value of max(0, −GAIN_ DIFF_1−GAIN_DIFF_2) if allowed by the power constraints at the node. Such power adjustment may compensate for potential end-to-end beamforming gain loss. Blocks

1712a and 1712b may be configured such that if (GAIN_DIFF_1+GAIN_DIFF_2)>0 (e.g., if the beamforming gain is increasing with the new beam widths), the transmission power at each node will not be reduced. Such an exception may help to prevent an outage from occurring before the new beams are used.

In block 1716a, Node 1 performs one or more data transmissions to Node 2, and in block 1716b, Node 2 performs one or more data transmissions to Node 1. In block 1720a, Node 1 measures the received signal power RX_PWR_1 of Node 2's transmission(s) in block 1716b, and in block 1720b, Node 2 measures the received signal power RX_PWR_2 of Node 1's transmission(s) in block 1716a. If Node 1 determines in block 1724a that RX_PWR_1 is higher than or equal to a threshold THRES1, and if Node 2 determines in block 1724b that RX_PWR_2 is higher than or equal to a threshold THRES2, then each node will determine its beam set for selection and schedule the beam training process with the other node by executing blocks 820a and 824a, and blocks 820b and 824b, respectively, as described above with reference to FIG. 8. In this case, in block 1732a Node 1 sends a BEAM_WIDTH_CONFIG signal with "success" configuration to Node 2, and in block 1732b Node 2 sends a BEAM_WIDTH_CONFIG signal with "success" configuration to Node 1.

However, if Node 1 determines in block 1724a that RX_PWR_1 is less than the threshold THRES1, or if Node 2 determines in block 1724b that RX_PWR_2 less than the threshold THRES2, (e.g., if the bi-directional power control requests are not fulfilled by either node), then at block 1728 the node that detects this failure will send a BEAM_WIDTH_CONFIG signal to the other node with a "failure" configuration to terminate the beam width control process.

If neither node requires any beam width control, the existing closed-loop power control scheme may remain in effect. If the beam width control occurs in an asymmetric manner (e.g., if only one of the nodes indicates a change to its beam width), a beam width and power control protocol as described above with reference to FIG. 17 may still be employed. To be more specific, even if a node's beam width control signal will indicate "no change," it may still be desired for the node to adjust its transmission power accordingly if the other node is changing its beam width.

The threshold THRES1 and THRES2 may have different definitions. In one example, THRES1 is defined as follows:
THRES1=RX_PWR_1_ORIGINAL+RX_PWR_1_TOL,
where RX_PWR_1_ORIGINAL is the original received power before beam width and power adjustment, and RX_PWR_1_TOL is a tolerance term. THRES2 may be similarly defined.

Figure 18:
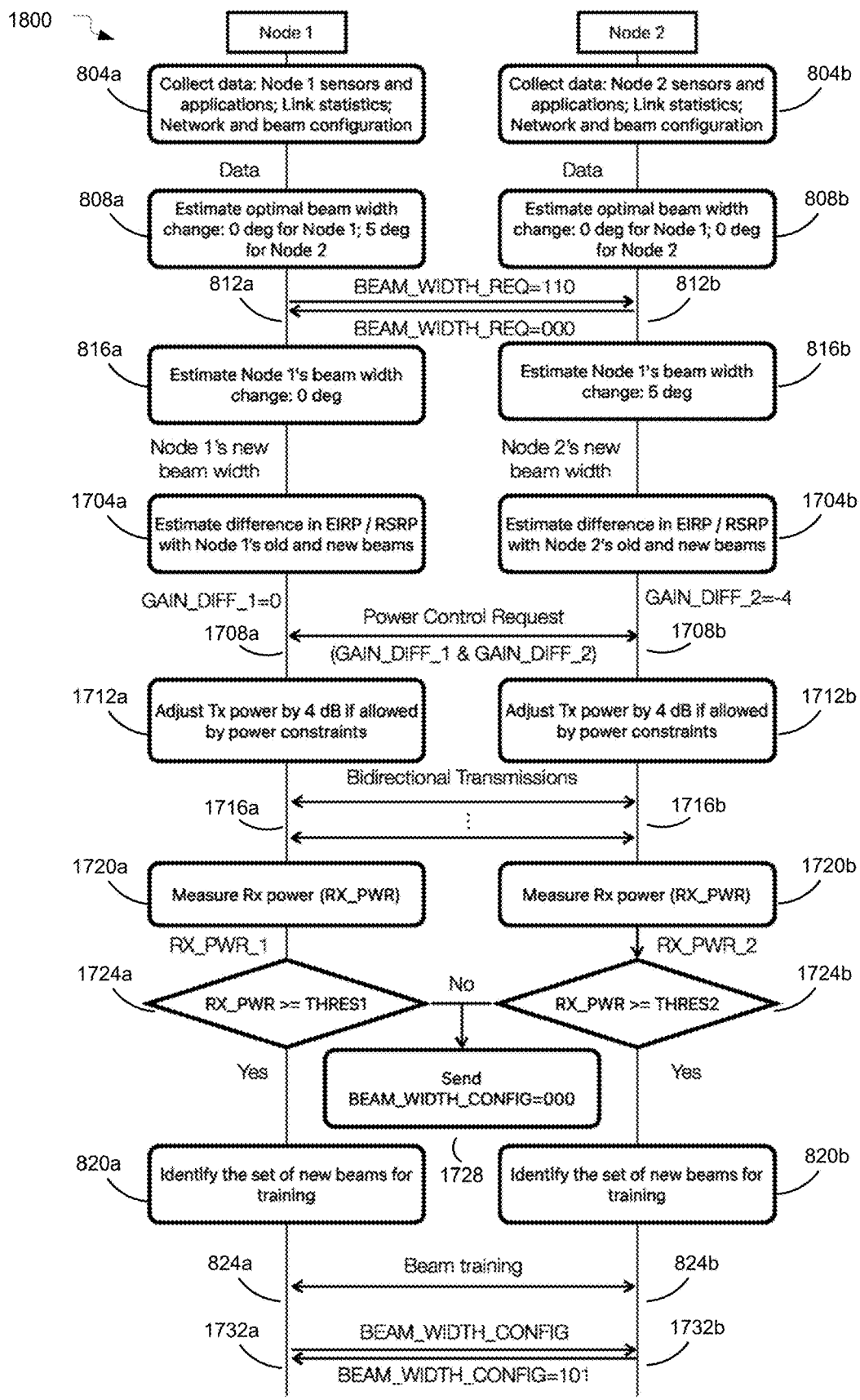
FIG. 18 shows a message sequence chart for an example of a process for joint beam width and transmission power control in accordance with some embodiments.

FIG. 18 shows an MSC for an example 1800 of process 1700 in which a joint on-demand beam width and transmission power control protocol as shown in FIG. 17 is applied to a scenario that begins with Node 2 transmitting to Node 1 using an initial beam width of four degrees (e.g., as described above with reference to FIG. 11). In example 1800: at block 808a, Node 1 estimates that Node 2 should increase its beam width by five degrees in order to improve the link robustness to Node 1's mobility; at block 808b, Node 2 determines that no change to Node 1's current beam width is needed, based on its information collected; at block 812a, Node 1 sends BEAM_WIDTH_REQ=110 to Node 2 using the 3-bit signal format, and at block 812b, Node 2 sends BEAM_WIDTH_REQ=000; at block 816a, Node 1 estimates that no change is needed to its own beam width, and at block 816b, Node 2 estimates a beam change to its beam width of five degrees.

In example 1800, as Node 1 has estimated that no change is needed to its own beam width, in block 1704a Node 1 estimates a GAIN_DIFF_1 value of zero. In block 1704b of example 1800, Node 2 estimates the difference in EIRP/RSRP between its old and new beams, and in this example the resulting value of GAIN_DIFF_2 is assumed to be −4 dB. Accordingly, Node 2 may require both Node 1 and itself to increase the transmission power by 4 dB before the beam width adjustment is performed. In block 1708a of example 1800, Node 1 sends an indication of the value GAIN_DIFF_1 to Node 2, and in block 1708b of example 1800, Node 2 sends an indication of the value GAIN_DIFF_2 to Node 1.

In blocks 1712a and 1712b of example 1800, respectively, each of Nodes 1 and 2 adjusts its transmission power by 4 dB if allowed by the power constraints at the node. In block 1716a of example 1800, Node 1 performs one or more data transmissions to Node 2, and in block 1716b of example 1800, Node 2 performs one or more data transmissions to Node 1. In block 1720a of example 1800, Node 1 measures the received signal power RX_PWR_1 of Node 2's transmission(s) in block 1716b, and in block 1720b of example 1800, Node 2 measures the received signal power RX_PWR_2 of Node 1's transmission(s) in block 1716a. If Nodes 1 and 2 determine in blocks 1724a and 1724b of example 1800, respectively, that the received power threshold is satisfied (e.g., if both nodes do increase Tx power by 4 dB according to the bi-directional measurements), then Node 2 will increase its own beam width by about five degrees (depending on its beamforming architecture, its codebook design, etc.) via scheduled beam training in block 824b of example 1800 and send feedback signal BEAM_WIDTH_CONFIG=101 to Node 1 in block 1732b of example 1800. However, if Node 2 determines in block 1724b of example 1800 that the received power threshold is not satisfied (e.g., if Node 1 increases its transmission power by only 1 dB, for example), then Node 2 will not adjust its beam width and will send a different feedback BEAM_WIDTH_CONFIG=000 to Node 1 in block 1728 of example 1800 to terminate the process.

Figure 19:
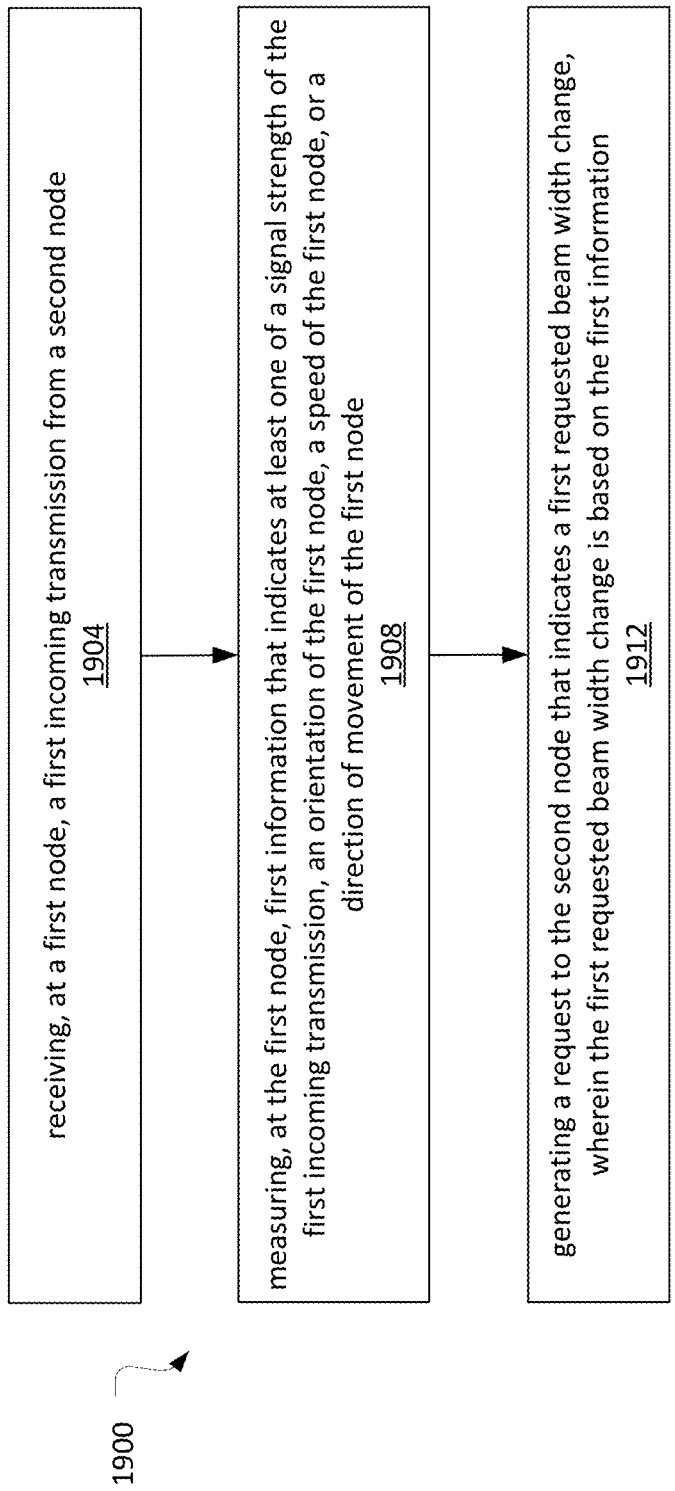
FIG. 19 illustrates an operational flow/algorithmic structure in accordance with some embodiments.

FIG. 19 illustrates an operation flow/algorithmic structure 1900 in accordance with some embodiments. The operation flow/algorithmic structure 1900 may be performed or implemented by a UE, such as, for example, any of UEs 104a-104e; or components thereof, for example, baseband processor 2404A. The operation flow/algorithmic structure 1900 may be performed or implemented by an access node, such as, for example, base station 108 or 112; or components thereof, for example, baseband processor 2504A.

The operation flow/algorithmic structure 1900 may include, at 1904, receiving, at a first node, a first incoming transmission from a second node.

The operation flow/algorithmic structure 1900 may include, at 1908, measuring, at the first node, first information that indicates at least one of a signal strength of the first incoming transmission, an orientation of the first node, a speed of the first node, or a direction of movement of the first node. The signal strength of the first incoming transmission may be at least one of reference signal received power (RSRP), reference signal received quality (RSRQ), or signal to interference noise ratio (SINR).

The operation flow/algorithmic structure 1900 may include, at 1912, generating a request to the second node that indicates a first requested beam width change, wherein the first requested beam width change is based on the first information. The first requested beam width change may be based on second information that indicates a beam width of the first incoming transmission. Additionally or alternatively, the first requested beam width change may comprise an angle (e.g., an angle specified in degrees). The operation flow/algorithmic structure 1900 may include causing the first node to transmit the request to the second node.

The operation flow/algorithmic structure 1900 may include receiving, at the first node, a request from the second node that indicates a second requested beam width change; and transmitting, to the second node, an outgoing transmission that is based on a transmit beam width, wherein the transmit beam width is based on the second requested beam width change.

The operation flow/algorithmic structure 1900 may include determining a transmit beam width change, based on third information that indicates at least one of the signal strength of the first incoming transmission, the beam width of the first incoming transmission, the orientation of the first node, the speed of the first node, or the direction of movement of the first node; and transmitting, to the second node, an outgoing transmission that is based on a transmit beam width, wherein the transmit beam width is based on the transmit beam width change. The operation flow/algorithmic structure 1900 may further include receiving, at the first node, a request from the second node that indicates a second requested beam width change, wherein the transmit beam width is based on the second requested beam width change.

Figure 20:
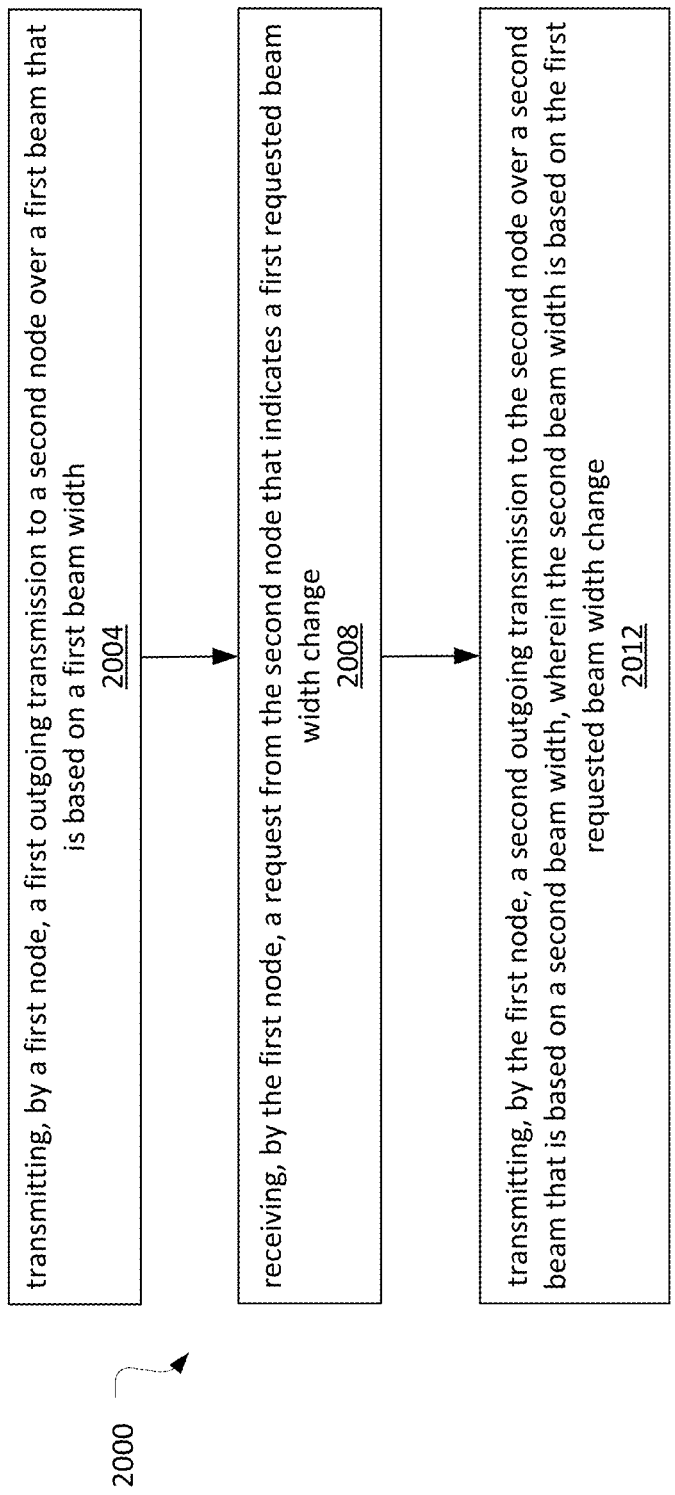
FIG. 20 illustrates an operational flow/algorithmic structure in accordance with some embodiments.

FIG. 20 illustrates an operation flow/algorithmic structure 2000 in accordance with some embodiments. The operation flow/algorithmic structure 2000 may be performed or implemented by a UE, such as, for example, any of UEs 104a-104e; or components thereof, for example, baseband processor 2404A. The operation flow/algorithmic structure 2000 may be performed or implemented by an access node, such as, for example, base station 108 or 112; or components thereof, for example, baseband processor 2504A.

The operation flow/algorithmic structure 2000 may include, at 2004, transmitting, by a first node, a first outgoing transmission to a second node over a first beam that is based on a first beam width.

The operation flow/algorithmic structure 2000 may include, at 2008, receiving, by the first node, a request from the second node that indicates a first requested beam width change. The first requested beam width change may comprise an angle (e.g., an angle specified in degrees).

The operation flow/algorithmic structure 2000 may include, at 2012, transmitting, by the first node, a second outgoing transmission to the second node over a second beam that is based on a second beam width, wherein the second beam width is based on the first requested beam width change. The first requested beam width change may be based on second information that indicates a beam width of the first incoming transmission. Additionally or alternatively, the first requested beam width change may comprise an angle (e.g., an angle specified in degrees). The operation flow/algorithmic structure 2000 may include causing the first node to transmit the request to the second node.

The operation flow/algorithmic structure 2000 may further include receiving, by the first node, an incoming transmission from the second node; measuring first information that comprises at least one of a signal strength of the incoming transmission, an orientation of the first node, a speed of the first node, or a direction of movement of the first node; based on the first information, determining a second requested beam width change; and generating a request that indicates the second requested beam width change. The signal strength of the incoming transmission may be at least one of RSRP, RSRQ, or SINR. The second requested beam width change may be based on second information that indicates a beam width of the incoming transmission. The second beam width may be based on the second requested beam width change. The operation flow/algorithmic structure 2000 may further include causing the first node to transmit the request to the second node. Additionally or alternatively, the operation flow/algorithmic structure 2000 may further include based on the second beam width, obtaining a beamforming configuration from a codebook.

Figure 21:
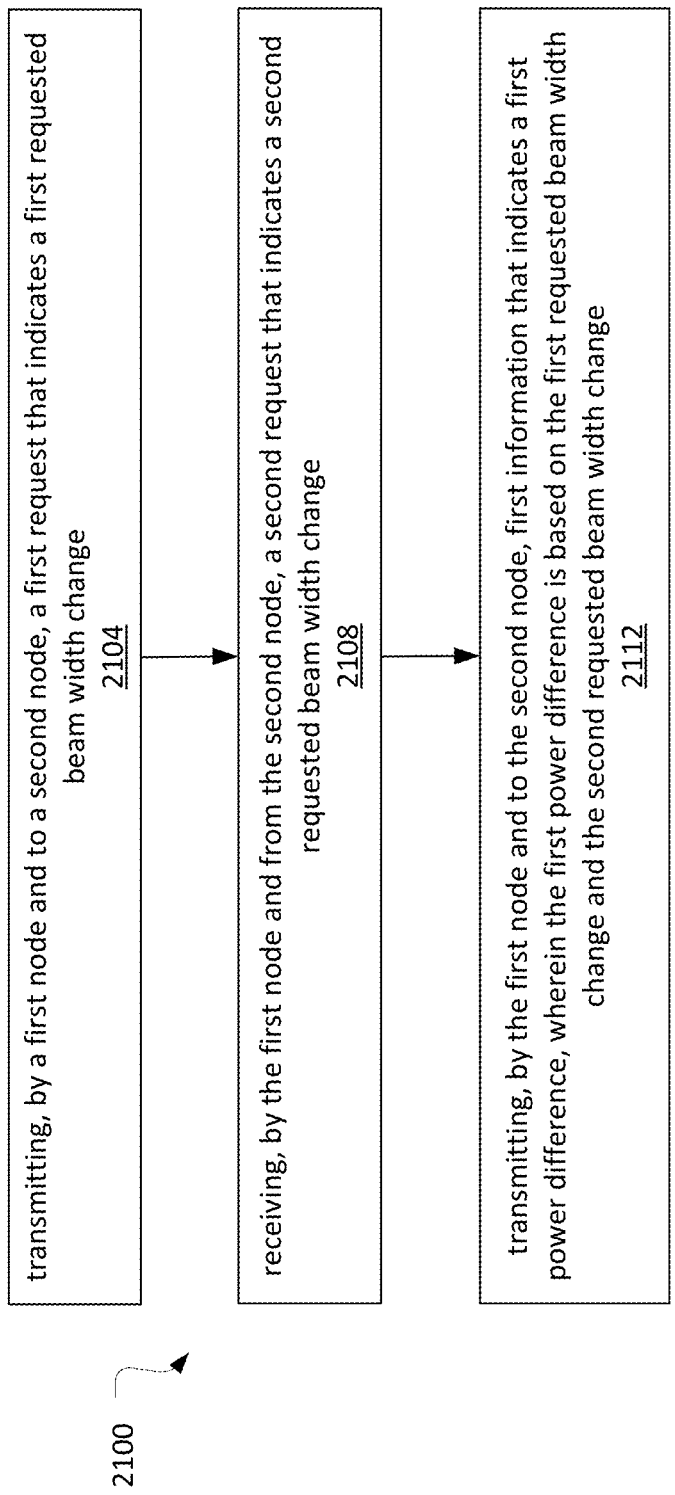
FIG. 21 illustrates an operational flow/algorithmic structure in accordance with some embodiments.

FIG. 21 illustrates an operation flow/algorithmic structure 2100 in accordance with some embodiments. The operation flow/algorithmic structure 2100 may be performed or implemented by a UE, such as, for example, any of UEs 104a-104e; or components thereof, for example, baseband processor 2404A. The operation flow/algorithmic structure 2100 may be performed or implemented by an access node, such as, for example, base station 108 or 112; or components thereof, for example, baseband processor 2504A.

The operation flow/algorithmic structure 2100 may include, at 2104, transmitting, by a first node and to a second node, a first request that indicates a first requested beam width change. The first requested beam width change may comprise an angle (e.g., an angle specified in degrees). The first requested beam width change may be based on at least one of an orientation of the first node, a speed of the first node, or a direction of movement of the first node.

The operation flow/algorithmic structure 2100 may include, at 2108, receiving, by the first node and from the second node, a second request that indicates a second requested beam width change. The second requested beam width change may comprise an angle (e.g., an angle specified in degrees). The first requested beam width change may comprise a first angle and the second requested beam width change may comprise a second angle.

The operation flow/algorithmic structure 2100 may include, at 2112, transmitting, by the first node and to the second node, first information that indicates a first power difference, wherein the first power difference is based on the first requested beam width change and the second requested beam width change.

The operation flow/algorithmic structure 2100 may also include determining an adjusted transmit power that is based on the first power difference; and transmitting, by the first node and to the second node, a first data transmission at the adjusted transmit power. The operation flow/algorithmic structure 2100 may further include receiving, by the first node and from the second node, second information that indicates a second power difference, wherein the adjusted transmit power may be based on the second power difference.

The operation flow/algorithmic structure 2100 may include receiving, by the first node and from the second node, a second data transmission; measuring, by the first node, a received power of the second data transmission; and transmitting, by the first node and to the second node, beam width configuration information that is based on the received power. The beam width configuration information may be based on information from a codebook. The operation flow/algorithmic structure 2100 may further include determining, by the first node, a first beam width that is based on the first requested beam width change and the second requested beam width change, wherein the first power difference may be based on the first beam width and the beam width configuration information may be based on the first beam width.

Figure 22:
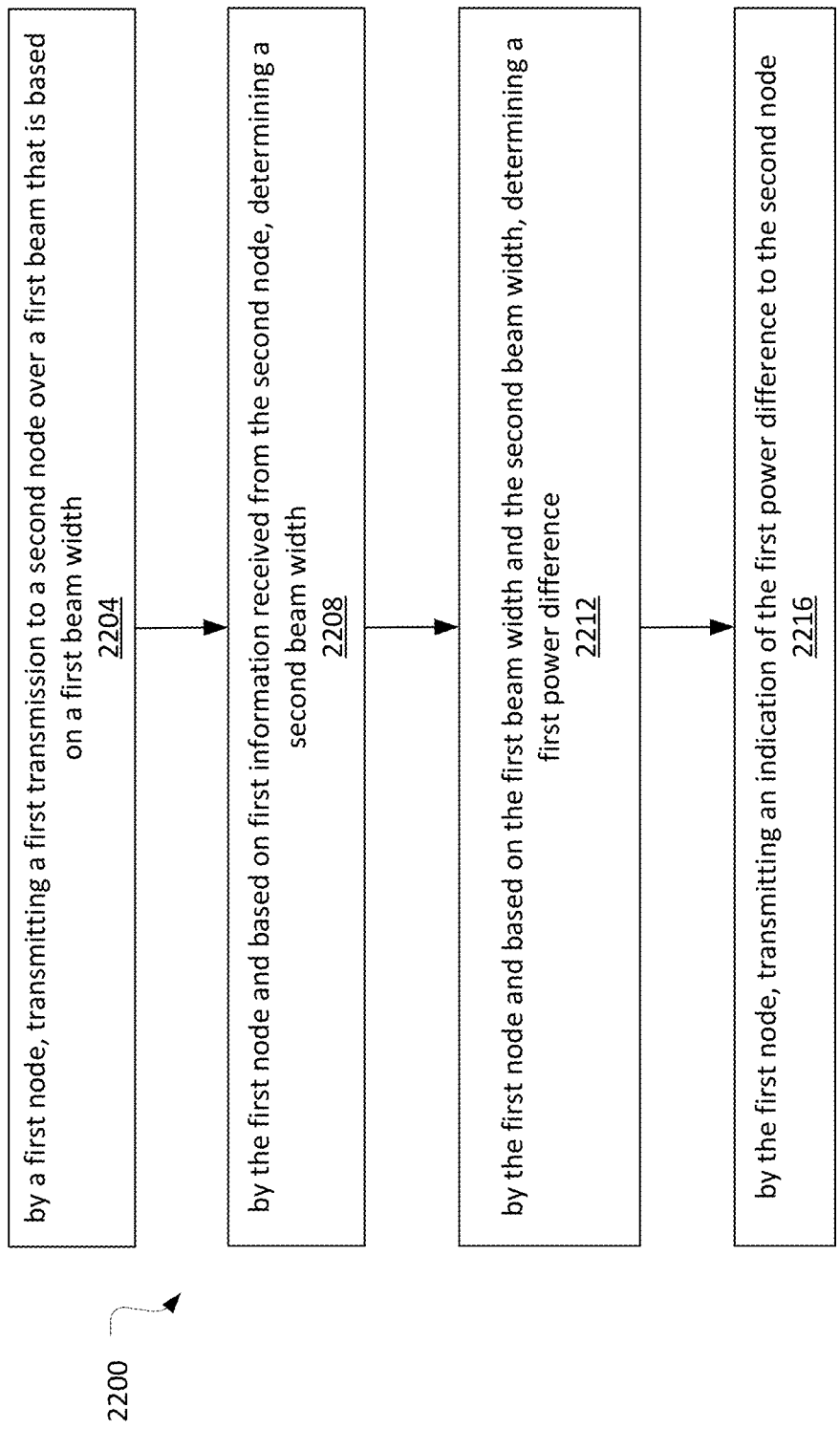
FIG. 22 illustrates an operational flow/algorithmic structure in accordance with some embodiments.

FIG. 22 illustrates an operation flow/algorithmic structure 2200 in accordance with some embodiments. The operation flow/algorithmic structure 2200 may be performed or implemented by a UE, such as, for example, any of UEs 104a-104e; or components thereof, for example, baseband processor 2404A. The operation flow/algorithmic structure 2200 may be performed or implemented by an access node, such as, for example, base station 108 or 112; or components thereof, for example, baseband processor 2504A.

The operation flow/algorithmic structure 2200 may include, at 2204, by a first node, transmitting a first transmission to a second node over a first beam that is based on a first beam width. The first information may indicate a requested beam width change, and the requested beam width change may comprise an angle (e.g., an angle specified in degrees). Additionally or alternatively, the first information may indicate at least one of an orientation of the second node, a speed of the second node, or a direction of movement of the second node.

The operation flow/algorithmic structure 2200 may include, at 2208, by the first node and based on first information received from the second node, determining a second beam width.

The operation flow/algorithmic structure 2200 may include, at 2212, by the first node and based on the first beam width and the second beam width, determining a first power difference.

The operation flow/algorithmic structure 2200 may include, at 2216, by the first node, transmitting an indication of the first power difference to the second node.

The operation flow/algorithmic structure 2200 may further include transmitting a second transmission to the second node over a second beam that is based on the first beam width and at a first power that is based on the first power difference. In such case, the operation flow/algorithmic structure 2200 may further include receiving, by the first node and from the second node, second information that indicates a second power difference, wherein the first power may be based on the second power difference.

The operation flow/algorithmic structure 2200 may further include, by the first node, transmitting a third transmission to the second node over a third beam that is based on the second beam width and at a second power that is based on the first power difference.

The operation flow/algorithmic structure 2200 may further include, by the first node: subsequent to transmitting the indication of the first power difference to the second node, receiving an incoming data transmission from the second node; measuring a received power of the incoming data transmission; and transmitting, to the second node, an indication of a beam width configuration that is based on the received power.

The operation flow/algorithmic structure 2200 may further include, by the first node and based on the second beam width, obtaining a beamforming configuration from a codebook.

Figure 23:
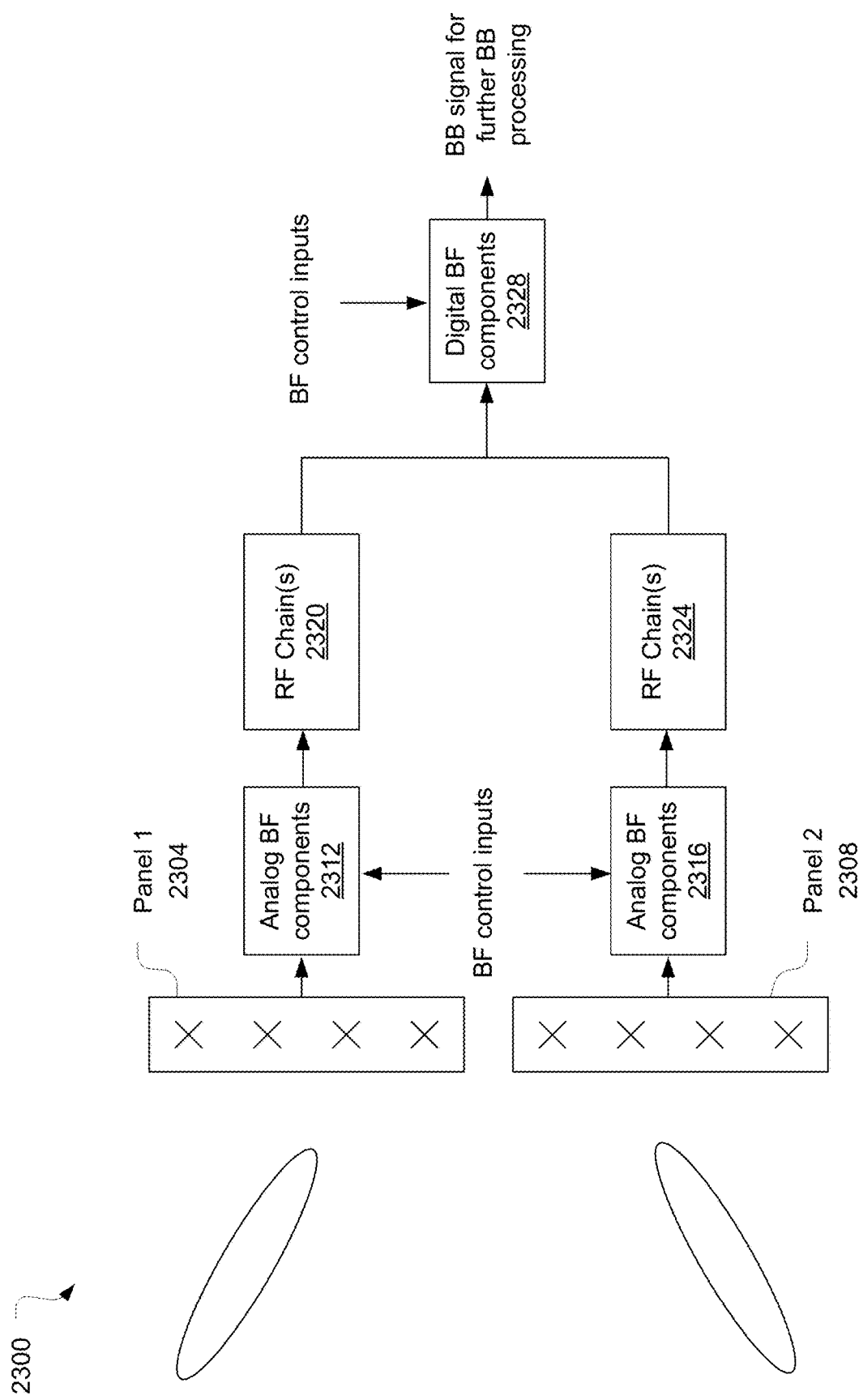
FIG. 23 illustrates beamforming components of a device in accordance with some embodiments.

FIG. 23 illustrates receive components 2300 of a device in accordance with some embodiments. The device may be, for example, any of the UEs 104a-104e or access node 108 or 112. The receive components 2300 may include a first antenna panel, panel 1 2304, and a second antenna panel, panel 2 2308. Each antenna panel may include a number of antenna elements.

The antenna panels may be coupled to respective analog beamforming (BF) components. For example, panel 1 2304 may be coupled with analog BF components 2312 and panel 2 2308 may be coupled with analog BF components 2316.

The analog BF components may be coupled with one or more radio-frequency (RF) chains. For example, analog BF components 2312 may be coupled with one or more RF chains 2320 and analog BF components 2316 may be coupled with one or more RF chains 2324. The RF chains may amplify a receive analog RF signal, downconvert the RF signal to baseband, and convert the analog baseband signal to a digital baseband signal, which may be provided to digital BF components 2328. The digital BF components 2328 may provide a baseband (BB signal) for further BB processing.

In various embodiments, control circuitry, which may reside in a baseband processor, may provide BF weights to the analog/digital BF components to provide a receive beam at respective antenna panels. These BF weights may be specified in a codebook and/or may be determined by the control circuitry based on received reference signals and corresponding quasi co-location (QCL)/transmission configuration indication (TCI) information as described, for example, in one or more 3GPP 5G NR TSs. In some embodiments, the BF weights may be phase-shift values provided to phase shifters of the analog BF components 2312 or complex weights provided to the digital BF components 2328. In some embodiments, the BF components and antenna panels may operate together to provide a dynamic phased-array that is capable of directing the beams in the desired direction.

In various embodiments, beamforming may include analog, only digital, or a hybrid analog-digital beamforming. Digital beamforming may utilize separate RF chains that respectively correspond to the antenna elements.

While the beamforming components 2300 describe receive beamforming, other embodiments may include beamforming components that perform transmit beamforming in analogous manners.

Figure 24:
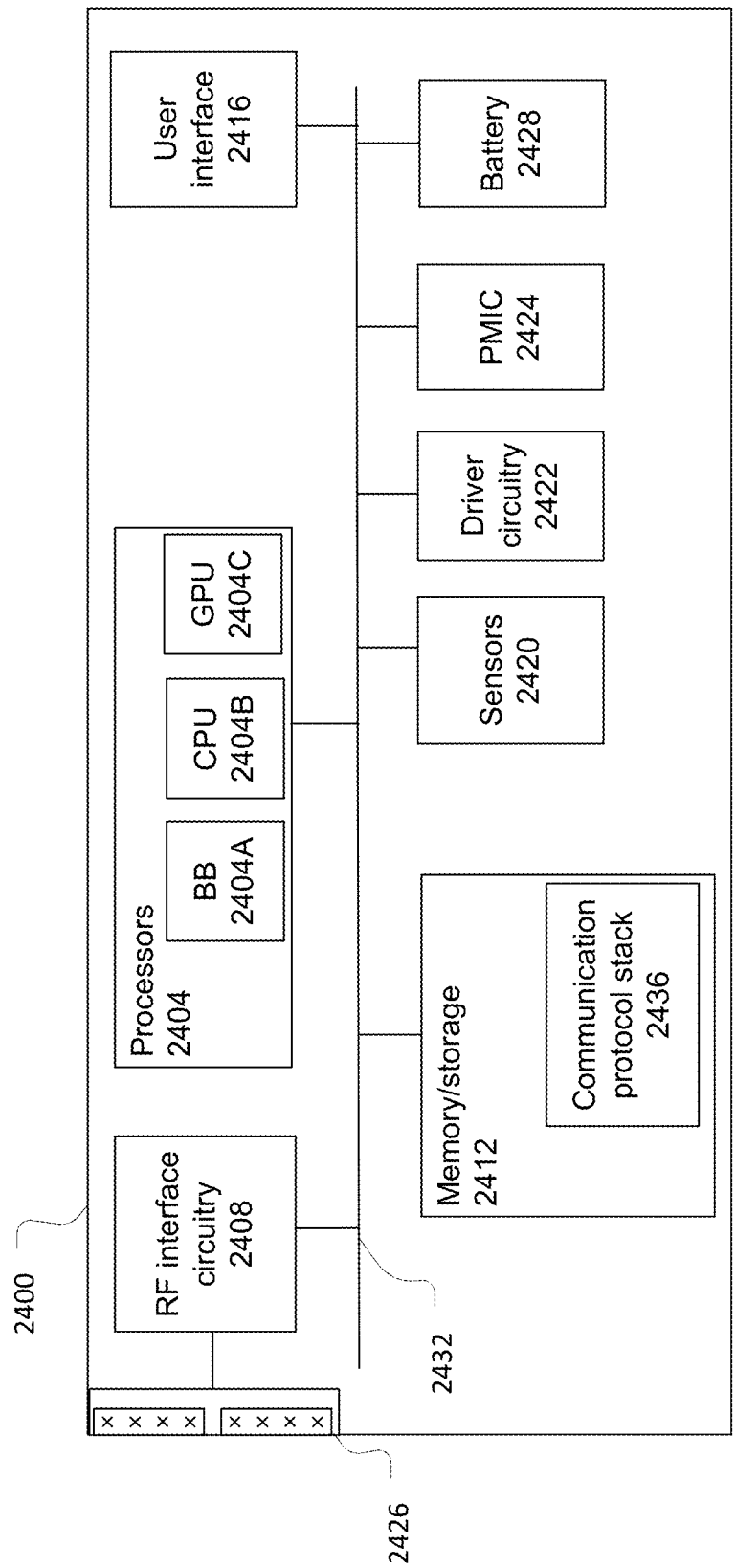
FIG. 24 illustrates a user equipment in accordance with some embodiments.

FIG. 24 illustrates a UE 2400 in accordance with some embodiments. The UE 2400 may be similar to and substantially interchangeable with any of UEs 104a-104e of FIG. 1.

The UE 2400 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 2400 may include processors 2404, RF interface circuitry 2408, memory/storage 2412, user interface 2416, sensors 2420, driver circuitry 2422, power management integrated circuit (PMIC) 2424, antenna 2426, and battery 2428. The components of the UE 2400 may be implemented as integrated circuits (ICs), portions thereof, discrete electronic devices, or other modules, logic, hardware, software, firmware, or a combination thereof. The block diagram of FIG. 24 is intended to show a high-level view of some of the components of the UE 2400. However, some of the components shown may be omitted, additional components may be present, and different arrangement of the components shown may occur in other implementations.

The components of the UE 2400 may be coupled with various other components over one or more interconnects 2432, which may represent any type of interface, input/output, bus (local, system, or expansion), transmission line, trace, optical connection, etc. that allows various circuit components (on common or different chips or chipsets) to interact with one another.

The processors 2404 may include processor circuitry such as, for example, baseband processor (BB) 2404A, central processor unit circuitry (CPU) 2404B, and graphics processor unit circuitry (GPU) 2404C. The processors 2404 may include any type of circuitry or processor circuitry that executes or otherwise operates computer-executable instructions, such as program code, software modules, or functional processes from memory/storage 2412 to cause the UE 2400 to perform operations as described herein.

In some embodiments, the baseband processor 2404A may access a communication protocol stack 2436 in the memory/storage 2412 to communicate over a 3GPP compatible network. In general, the baseband processor 2404A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 2408.

The baseband processor 2404A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 2412 may include one or more non-transitory, computer-readable media that includes instructions (for example, communication protocol stack 2436) that may be executed by one or more of the processors 2404 to cause the UE 2400 to perform various operations described herein. The memory/storage 2412 include any type of volatile or non-volatile memory that may be distributed throughout the UE 2400. In some embodiments, some of the memory/storage 2412 may be located on the processors 2404 themselves (for example, L1 and L2 cache), while other memory/storage 2412 is external to the processors 2404 but accessible thereto via a memory interface. The memory/storage 2412 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 2408 may include transceiver circuitry and radio frequency front module (RFEM) that allows the UE 2400 to communicate with other devices over a radio access network. The RF interface circuitry 2408 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna 2426 and proceed to filter and amplify (with a low-noise amplifier) the signal. The signal may be provided to a receiver of the transceiver that down-converts the RF signal into a baseband signal that is provided to the baseband processor of the processors 2404.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 2426.

In various embodiments, the RF interface circuitry 2408 may be configured to transmit/receive signals in a manner compatible with NR access technologies.

The antenna 2426 may include antenna elements to convert electrical signals into radio waves to travel through the air and to convert received radio waves into electrical signals. The antenna elements may be arranged into one or more antenna panels. The antenna 2426 may have antenna panels that are omnidirectional, directional, or a combination thereof to enable beamforming and multiple input, multiple output communications. The antenna 2426 may include microstrip antennas, printed antennas fabricated on the surface of one or more printed circuit boards, patch antennas, phased array antennas, etc. The antenna 2426 may have one or more panels designed for specific frequency bands including bands in FR1 or FR2.

The user interface 2416 includes various input/output (I/O) devices designed to enable user interaction with the UE 2400. The user interface 2416 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 2400.

The sensors 2420 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 2422 may include software and hardware elements that operate to control particular devices that are embedded in the UE 2400, attached to the UE 2400, or otherwise communicatively coupled with the UE 2400. The driver circuitry 2422 may include individual drivers allowing other components to interact with or control various input/output (I/O) devices that may be present within, or connected to, the UE 2400. For example, driver circuitry 2422 may include a display driver to control and allow access to a display device, a touchscreen driver to control and allow access to a touchscreen interface, sensor drivers to obtain sensor readings of sensors 2420 and control and allow access to sensors 2420, drivers to obtain actuator positions of electro-mechanic components or control and allow access to the electro-mechanic components, a camera driver to control and allow access to an embedded image capture device, audio drivers to control and allow access to one or more audio devices.

The PMIC 2424 may manage power provided to various components of the UE 2400. In particular, with respect to the processors 2404, the PMIC 2424 may control power-source selection, voltage scaling, battery charging, or DC-to-DC conversion.

In some embodiments, the PMIC 2424 may control, or otherwise be part of, various power saving mechanisms of the UE 2400 including DRX as discussed herein.

A battery 2428 may power the UE 2400, although in some examples the UE 2400 may be mounted deployed in a fixed location, and may have a power supply coupled to an electrical grid. The battery 2428 may be a lithium ion battery, a metal-air battery, such as a zinc-air battery, an aluminum-air battery, a lithium-air battery, and the like. In some implementations, such as in vehicle-based applications, the battery 2428 may be a typical lead-acid automotive battery.

Figure 25:
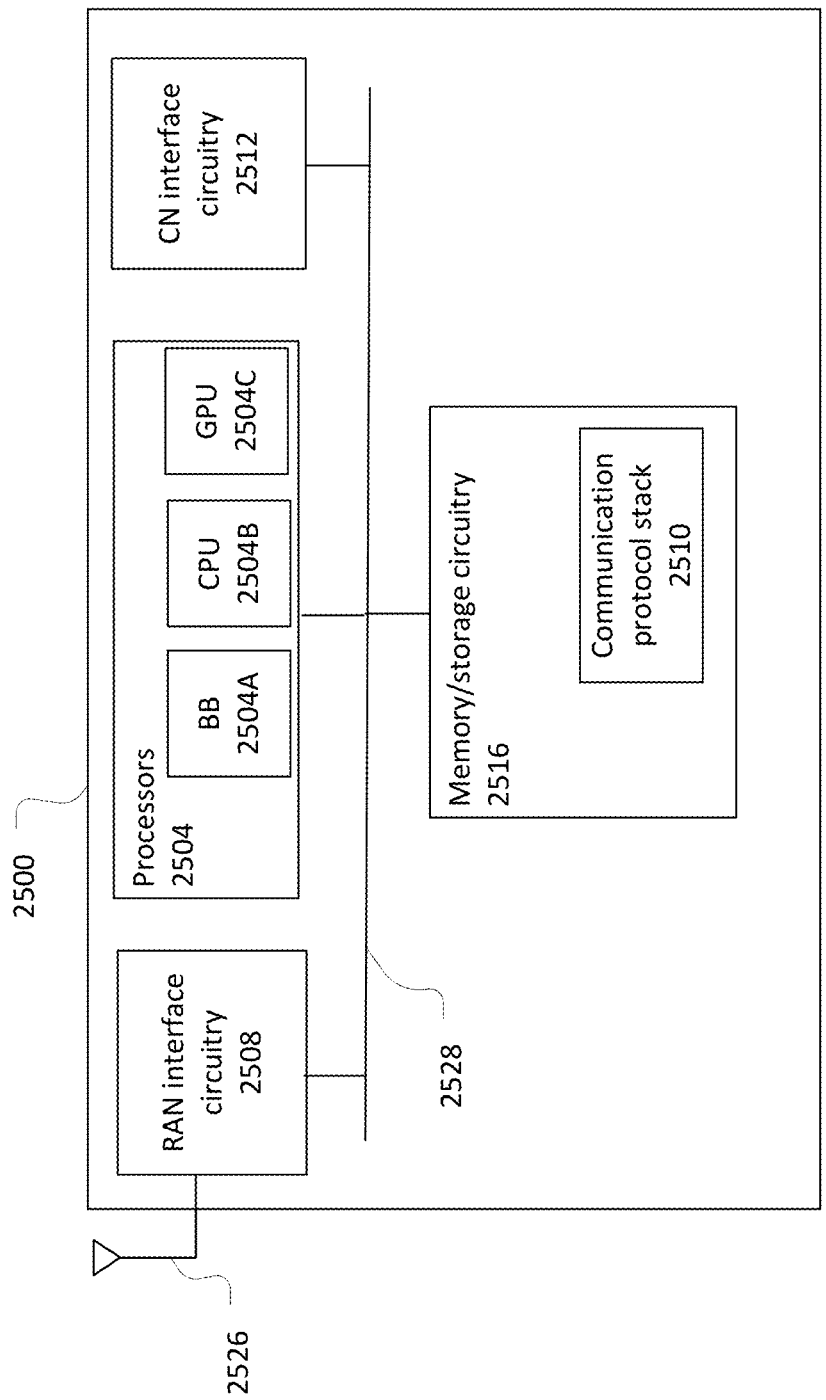
FIG. 25 illustrates a base station in accordance with some embodiments.

FIG. 25 illustrates an access node 2500 (e.g., a base station or gNB) in accordance with some embodiments. The access node 2500 may be similar to and substantially interchangeable with access node 108 or 112.

The access node 2500 may include processors 2504, RF interface circuitry 2508, core network (CN) interface circuitry 2512, memory/storage circuitry 2516, and antenna 2526.

The components of the access node 2500 may be coupled with various other components over one or more interconnects 2528.

The processors 2504, RF interface circuitry 2508, memory/storage circuitry 2516 (including communication protocol stack 2510), antenna 2526, and interconnects 2528 may be similar to like-named elements shown and described with respect to FIG. 13.

The CN interface circuitry 2512 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the access node 2500 via a fiber optic or wireless backhaul. The CN interface circuitry 2512 may include one or more dedicated processors or FPGAs to communicate using one or more of the aforementioned protocols. In some implementations, the CN interface circuitry 2512 may include multiple controllers to provide connectivity to other networks using the same or different protocols.

As described above, one aspect of the present technology is the gathering and use of data available from specific and legitimate sources for beam width control. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to reduce a probability of link failure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of mobility data during registration for services or anytime thereafter. In yet another example, users can select to limit the length of time mobility-associated data is maintained or entirely block the transfer of mobility data. In addition to providing "opt in" and "opt out" options, the present disclosure contemplates providing notifications relating to the access or use of personal information. For instance, a user may be notified that mobility data will be provided to the network.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of beam width control, the method comprising: receiving, at a first node, first information indicating at least one of an orientation of a second node, a speed of the second node, or a direction of movement of the second node; based on the first information, determining a beam width; and transmitting a data transmission to the second node over a beam that is based on the beam width.

Example 2 includes the method of Example 1 or some other example herein, wherein the first information indicates at least one of a location of a blockage or a direction of movement of the blockage.

Example 3 includes the example of any of Examples 1-2 or some other example herein, wherein determining the beam width is based on at least one of a location of a blockage or a direction of movement of the blockage.

Example 4 includes the example of any of Examples 1-3 or some other example herein, wherein the method comprises, based on the beam width, obtaining a beamforming configuration from a codebook.

Example 5 includes the example of any of Examples 1-4 or some other example herein, wherein determining the beam width is based on second information from an image captured by a camera.

Example 6 includes the example of any of Examples 1-5 or some other example herein, wherein determining the beam width is based on a value of at least one link statistic.

Example 7 includes the example of any of Examples 1-5 or some other example herein, wherein at least one of the first node or the second node is an access point of a non-terrestrial network (NTN).

Example 8 includes the example of any of Examples 1-7 or some other example herein, wherein at least one of the first node or the second node is airborne.

Example 9 includes the example of any of Examples 1-8 or some other example herein, wherein the method comprises generating a request that indicates a requested beam width change, wherein the requested beam width change is based on third information that indicates a beam configuration of the second node.

Example 10 includes the example of any one of Examples 1-9 or some other example herein, wherein a transmission power of the data transmission is based on the beam width.

Example 11 includes a method of beam width control, the method comprising: receiving first information indicating a location of a node; based on the first information and on a location of a reflective surface, determining a beam width; and transmitting a data transmission to the node over a beam that is based on the beam width.

Example 12 includes the example of Example 11 or some other example herein, wherein: the method comprises receiving second information indicating at least one of an orientation of the node, a speed of the node, or a direction of movement of the node; and determining the beam width is based on the second information.

Example 13 includes the example of any of Examples 11-12 or some other example herein, wherein the reflective surface is a reconfigurable intelligent surface (RIS).

Example 14 includes the example of any of Examples 11-13 or some other example herein, wherein determining the beam width is based on a configuration of the reflective surface.

Example 15 includes the example of any of Examples 11-14 or some other example herein, wherein the method comprises: receiving an incoming data transmission from the node; and transmitting, to the node, a request that indicates a requested beam width change.

Example 16 includes a method of beam width control, the method comprising: receiving, at an access point, first information indicating, for each of a plurality of nodes, a location of the node; based on the first information, determining a beam width; and transmitting, by the access point, a data transmission to the nodes over a beam that is based on the beam width or some other example herein.

Example 17 includes the example of Example 16 or some other example herein, wherein a transmission power of the beam is based on the first information.

Example 18 includes the example of any of Examples 16-17 or some other example herein, wherein receiving the first information comprises receiving the first information from one among the plurality of nodes.

Example 19 includes the example of any one of Examples 16-18 or some other example herein, wherein the method comprises, based on the beam width, obtaining a beamforming configuration from a codebook.

Example 20 includes the example of any one of Examples 16-19 or some other example herein, wherein determining the beam width is based on a location of a reflective surface.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause a processing circuitry to:
   process first information, received at a first node of a wireless cellular network, indicating at least one of an orientation of a second node of the wireless cellular network, a speed of the second node, or a direction of movement of the second node;
   based on the first information, determine a first beam width;
   generate a first data transmission to be transmitted to the second node over a first beam that is based on the first beam width;
   receive, from the second node, a request indicating a requested beam width change;
   based on the requested beam width change, determine a second beam width; and
   generate a second data transmission to be transmitted to the second node over a second beam that is based on the second beam width.

2. The one or more non-transitory computer-readable media of claim 1, wherein the first information indicates at least one of a location of a blockage or a direction of movement of the blockage.

3. The one or more non-transitory computer-readable media of claim 1, wherein determining the beam width is based on at least one of a location of a blockage or a direction of movement of the blockage.

4. The one or more non-transitory computer-readable media of claim 1, wherein the instructions, when executed, cause the processing circuitry to obtain, based on the beam width, a beamforming configuration from a codebook.

5. The one or more non-transitory computer-readable media of claim 1, wherein determining the beam width is based on second information from an image captured by a camera.

6. The one or more non-transitory computer-readable media of claim 1, wherein determining the beam width is based on a value of at least one link statistic.

7. The one or more non-transitory computer-readable media of claim 1, wherein at least one of the first node or the second node is an access point of a non-terrestrial network (NTN).

8. The one or more non-transitory computer-readable media of claim 1, wherein at least one of the first node or the second node is airborne.

9. The one or more non-transitory computer-readable media of claim 1, wherein the request is a first request and the requested beam width change is a first requested beam width change and wherein the instructions, when executed, cause the processing circuitry to generate a second request, for transmission to the second node, that indicates a second requested beam width change for transmissions from the second node to the first node, wherein the second requested beam width change is based on third information that indicates a beam configuration of the second node.

10. The one or more non-transitory computer-readable media of claim 1, wherein a transmission power of the data transmission is based on the beam width.

11. The one or more non-transitory computer-readable media of claim 1, wherein the first and second data transmissions are to terminate at the second node, and wherein the first information is received from the second node.

12. An apparatus comprising:
processing circuitry to:
  process first information indicating a location of a node and at least one of an orientation of the node, a speed of the node, or a direction of movement of the node;
  based on the first information and on a location of a reflective surface in an environment external to the apparatus, determine a first beam width;
  cause the apparatus to generate a first data transmission to be transmitted to the node via the reflective surface over a beam that is based on the first beam width, wherein the first data transmission is to terminate at the node;
  receive, from the node, a request indicating a requested beam width change;
  based on the requested beam width change, determine a second beam width; and
  cause the apparatus to generate a second data transmission to be transmitted to the node over a second beam that is based on the second beam width;
  and
interface circuitry coupled with the processing circuitry to enable communication.

13. The apparatus of claim 12, wherein the reflective surface is a reconfigurable intelligent surface (RIS).

14. The apparatus of claim 12, wherein the processing circuitry is to determine the beam width based on a configuration of the reflective surface.

15. A method of beam width control, the method comprising:
  processing first information, received at an access point, indicating, for each of a plurality of nodes, a location of the node;
  based on the first information, determining a beam width and a transmission power for a data transmission; and
  generating the data transmission to be transmitted by the access point, to the nodes over a beam that is based on the beam width and the transmission power.

16. The method of claim 15, wherein said processing the first information comprises processing the first information received from one among the plurality of nodes.

17. The method of claim 15, wherein the method comprises, based on the beam width, obtaining a beamforming configuration from a codebook.

18. The method of claim 15, wherein said determining the beam width is based on a location of a reflective surface.

19. The method of claim 15, wherein the first information further indicates, for each of the plurality of nodes, at least one of an orientation of the node, a speed of the node, or a direction of movement of the node.

* * * * *